(12) United States Patent
Hanaoka et al.

(10) Patent No.: US 10,019,483 B2
(45) Date of Patent: Jul. 10, 2018

(54) SEARCH SYSTEM AND SEARCH METHOD

(71) Applicant: Hitachi, Ltd., Chiyoda-ku, Tokyo (JP)

(72) Inventors: Miyuki Hanaoka, Tokyo (JP); Shinichi Kawamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 419 days.

(21) Appl. No.: 14/771,430

(22) PCT Filed: Jul. 30, 2013

(86) PCT No.: PCT/JP2013/070553
§ 371 (c)(1),
(2) Date: Aug. 28, 2015

(87) PCT Pub. No.: WO2015/015559
PCT Pub. Date: Feb. 5, 2015

(65) Prior Publication Data
US 2016/0004749 A1    Jan. 7, 2016

(51) Int. Cl.
*G06F 17/00* (2006.01)
*G06F 17/30* (2006.01)
(52) U.S. Cl.
CPC .. *G06F 17/30477* (2013.01); *G06F 17/30554* (2013.01)
(58) Field of Classification Search
None
See application file for complete search history.

(56) References Cited

U.S. PATENT DOCUMENTS

2003/0058706 A1* 3/2003 Okamoto ............... G06Q 10/06
                                                        365/200
2003/0208560 A1* 11/2003 Inoue .................... G06Q 20/20
                                                        709/219
(Continued)

FOREIGN PATENT DOCUMENTS

JP   2011-221799 A   11/2011
JP   2012-256324 A   12/2012

OTHER PUBLICATIONS

PCT International Search report on application PCT/JP2013/070553 dated Sep. 3, 2013; 3 pages.
(Continued)

*Primary Examiner* — Thu Nga Nguyen
(74) *Attorney, Agent, or Firm* — Foley & Lardner LLP

(57) ABSTRACT

A search system executes: a first write procedure of extracting, for data in a data sequence, metadata from the data in input order and writing the metadata into a first storage module in association with identification information uniquely identifying the data; a second write procedure of writing, in parallel with the first write procedure, the data in the data sequence into a second storage module in input order in association with the identification information, and writing the identification information in the second storage module into a third storage module; a reception procedure of receiving a search request including a first search condition relating to search target data; a search procedure of searching a search destination, which is selected from the first and third storage modules in accordance with the search request received, for the identification information satisfying the first search condition; and an output procedure of outputting a search result.

10 Claims, 24 Drawing Sheets

(56) References Cited

U.S. PATENT DOCUMENTS

| | | | |
|---|---|---|---|
| 2009/0043942 A1* | 2/2009 | Shiga | G06F 3/0605 |
| | | | 711/4 |
| 2011/0231364 A1* | 9/2011 | Hashimoto | G06F 21/33 |
| | | | 707/620 |
| 2012/0150792 A1* | 6/2012 | Yassin | G06Q 10/00 |
| | | | 707/602 |
| 2012/0278354 A1* | 11/2012 | Yan | G06Q 10/063 |
| | | | 707/769 |
| 2012/0317155 A1 | 12/2012 | Ogasawara et al. | |
| 2012/0330931 A1 | 12/2012 | Nakano et al. | |

OTHER PUBLICATIONS

PCT Written Opinion on application PCT/JP2013/070553 dated Sep. 3, 2013; 3 pages.

\* cited by examiner

SEARCH SYSTEM AND SEARCH METHOD

BACKGROUND OF THE INVENTION

This invention relates to a search system and a search method.

Hitherto, there is disclosed a technology for extracting metadata from raw data as an extraction source of the metadata, storing the raw data and the metadata in association with each other, and analyzing data using the metadata (for example, refer to JP 2011-221799 A).

There is also disclosed a technology for processing various types of "big data" (for example, refer to JP 2012-256324 A). In the technology disclosed in JP 2012-256324 A, an integrated data management system is constructed of more than one data management system. External applications or users access the integrated data management system using a unified interface. Raw data corresponding to a foreign data object is transmitted to be stored in any one of storage modules of a plurality of coupled data management systems based on a plurality of predetermined characteristics (for example, including size or data type). On the other hand, metadata corresponding to a foreign data object is stored in a specific data storage module irrespective of where the raw data is stored.

In this way, the above-mentioned related art executes extraction and writing of metadata and writing of raw data in series. In other words, the related art confirms that the raw data is already written and then stores the metadata. Therefore, the above-mentioned related art confirms whether or not the raw data is already written when storing the metadata, and when the raw data is present, the above-mentioned related art stores the metadata. On the other hand, when the raw data is not present, the above-mentioned related art buffers the metadata temporarily, and writes the metadata as well after storing the raw data.

However, in the above-mentioned related art, the metadata is written only after the raw data is written. Accordingly, when the raw data or metadata needs to be searched for in real time, it is necessary to wait until the raw data is written. As a result, the performance of extraction and writing of metadata is affected by the performance of writing of raw data, thereby causing a problem of degrading reed time performance. Further, when the writing of metadata is completed before the writing of its raw data, an error occurs when trying to search with the metadata to refer to its raw data because the writing of the raw data is not yet completed.

Further, there is a problem in that it is difficult to manage a shared memory between the extraction and writing of metadata and the writing of raw data. In other words, the extraction and writing of metadata and the writing of raw data compete for a lock and hence the performances of the extraction and writing of metadata and the writing of raw data deteriorate. For example, when the performance of the extraction and writing of metadata deteriorates, counting of metadata is delayed, thus leading to a difficulty in ensuring the real time performance.

SUMMARY OF THE INVENTION

It is an object of this invention to improve the real time performance of processing of searching for data and its metadata that are written in parallel.

According to the exemplary embodiments of this invention, it is possible to improve the real time performance of searching for data and its metadata that are written in parallel. Other objects, configurations, and effects than those described above are clarified by the following description of an embodiment.

DETAILED DESCRIPTION OF THE PREFERRED EMBODIMENTS

A data analysis according to embodiments of this invention counts metadata and visualizes the metadata for users. When carrying out a detailed analysis, the data analysis searches data for based on metadata, and retrieves data corresponding to the metadata. Further, in a use case where data is counted and analyzed in real time, the data analysis retrieves metadata and writes data in parallel to prevent performance of metadata processing from being affected by performance of data processing.

It should be noted that the metadata is stored in a storage apparatus such as a relational database (RDB) to execute the search and counting with high speeds. Further, data as an extraction source of the metadata is stored in a file system, an object storage, or the like that has large capacity and is inexpensive. Further, data to be subjected to a data analysis is time-series data such as a server log or a comment in a social networking service (SNS).

First Embodiment

A search system according to a first embodiment of this invention executes writing and extraction of metadata and writing of data in parallel. The metadata is written into a metadata table without waiting for the data as an extraction source of the metadata to be written. The search system executes count processing using only the metadata table. Data to be searched for at the time of a data search is data already written at the time of the search. It is possible to write and count only the metadata ahead of the data, and hence the performance of extraction and writing of metadata is not affected by the performance of storing of data. Accordingly, the search system can execute counting and visualization of metadata in real time. Further, the search system can execute can avoid an error indicating non-presence of data associated with the metadata at the time of a data search. Now, a description is given with reference to the drawings.

<Example of Search Processing>

Figure 1:
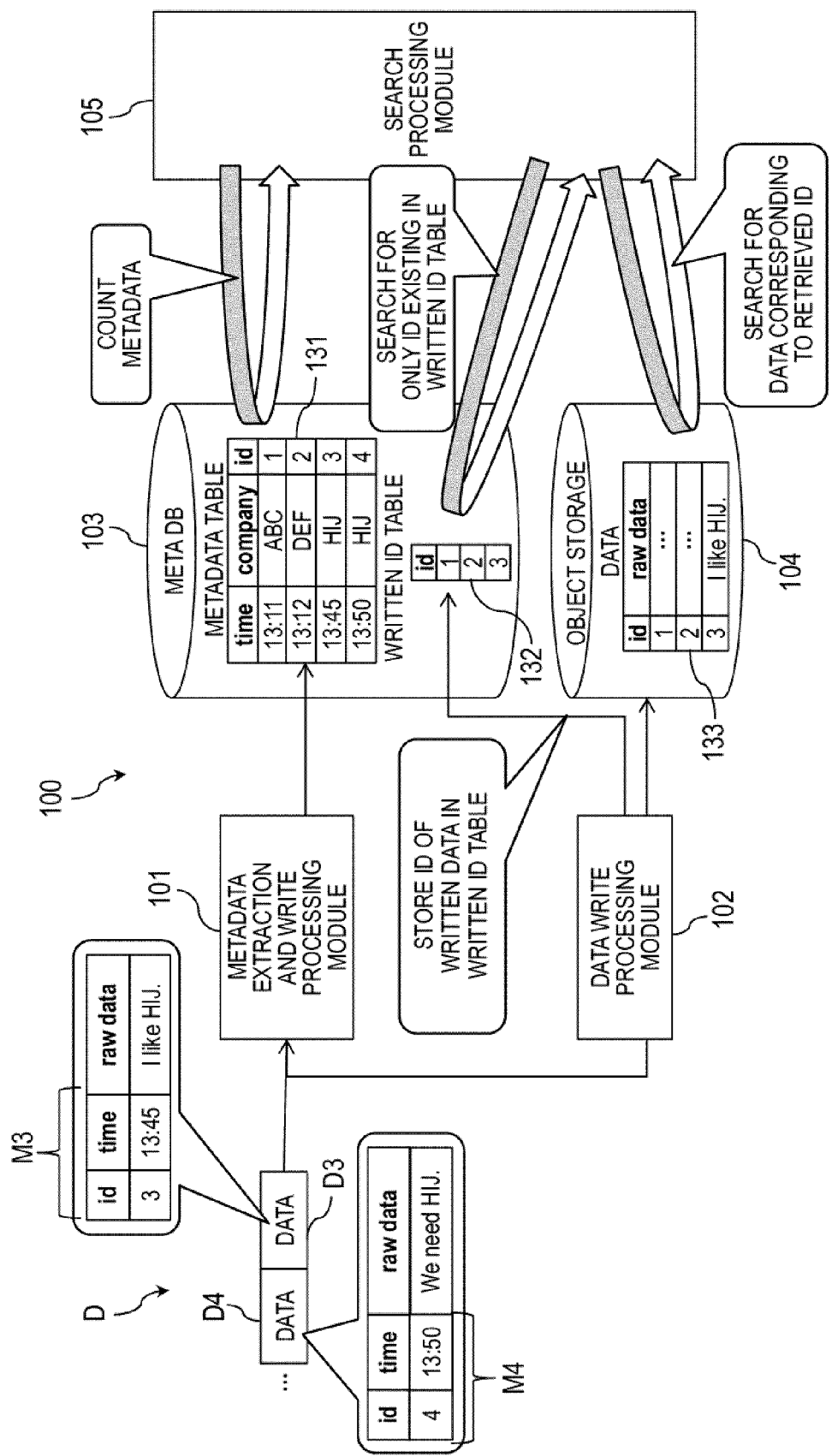
FIG. 1 is an explanatory diagram for illustrating an example of search processing according to the first embodiment.

FIG. 1 is an explanatory diagram for illustrating an example of search processing according to the first embodiment. Referring to FIG. 1, a description is given taking as an example a case in which a data sequence is input to a search system 100. The search system 100 includes a search apparatus. A data sequence D is a series of data that are input in order of data D3, data D4, . . . in chronological order. In this case, the data D3 is character string data, for example, "I like HIJ.", and the data D4 is character string data, for example, "We need HIJ."

Each data in the data sequence D includes metadata such as an ID and time. For example, the data D3 includes metadata M3 indicating "id=3, time=13:45" and the data D4 includes metadata M4 indicating "id=4, time 13:50".

The search system 100 processes data of the data sequence D in input order. Specifically, the search system 100 executes processing by a metadata extraction and write processing module 101 and processing by data write processing module 102 in parallel for input data.

The metadata extraction and write processing module 101 executes processing of extracting metadata from data and writing the extracted metadata into a meta database (DB) 103. For example, the metadata extraction and write processing module 101 extracts the metadata M3 from the data D3 and extracts the metadata M4 from the data D4. Further, in addition to simply extracting metadata from data, the metadata extraction and write processing module 101 may analyze contents of data and extract specific metadata from the analyzed data.

For example, when dictionary data of company names is prepared in the search system 100 and data includes a character string matching a company name of the dictionary data, the character string may be extracted as the metadata. In the case of the data D3, when "HIJ" in "I like HIJ." matches a company name of the dictionary data, "HIJ" is extracted as the metadata.

The data write processing module 102 writes data into an object storage 104. When writing data into the object storage 104, the data write processing module 102 writes data with an ID of the metadata as its index. For example, a file system or an object storage is employed as the object storage 104, but any system that can store data with the ID as its index may be employed without being limited to the above-mentioned systems. It should be noted that the data write processing module 102 may write metadata other than the ID directly into the object storage 104 or delete the metadata. Further, when the data write processing module 102 writes data into the object storage 104, the data write processing module 102 writes the ID as the metadata of the data into a written ID table 132 in the meta DB 103. For example, when the data write processing module 102 writes the data D3 into the object storage 104, the data write processing module 102 writes the ID (id=3) of the metadata M3 of the data D3 into the written ID table 132.

It should be noted that in FIG. 1, a state is illustrated in which the writing of the data D3 and its metadata M3 is completed, and the metadata M4 is already written into the metadata table 131 whereas the data D4 is not written into the object storage 104 yet. Further, it is assumed that data and its metadata having id=1, 2 and preceding the data D3 are already stored in the object storage 104 and the meta DB 103.

Next, a description is given of a search processing module 105. The search processing module 105 refers to the meta DB 103 or the object storage 104 to execute a search. When counting metadata, the search processing module 105 refers to the metadata table 131 of the meta DB 103. For example, when counting the number of data records for each company, the search processing module 105 refers to the metadata table 131 to obtain a count result of one record of "ABC", one record of "DEF", and two records of "HIJ". Accordingly, the search processing module 105 can count the metadata without waiting for the data to be stored.

Further, when searching for data, the search processing module 105 searches for an ID satisfying a search condition included in a search request from a search requestor. For example, when the search condition includes the character string "HIJ", id=3, 4 satisfy this condition in the metadata table 131. However, id=4 is not stored in the written ID table 132 whereas id=1 to 3 are stored therein. Accordingly, the search processing module 105 retrieves only id=3. Then, the search processing module 105 retrieves the data D3 corresponding to the retrieved id=3 from the object storage 104.

Thus, a search error caused by searching for data that is not stored in the object storage 104 can be avoided.

Figure 2:
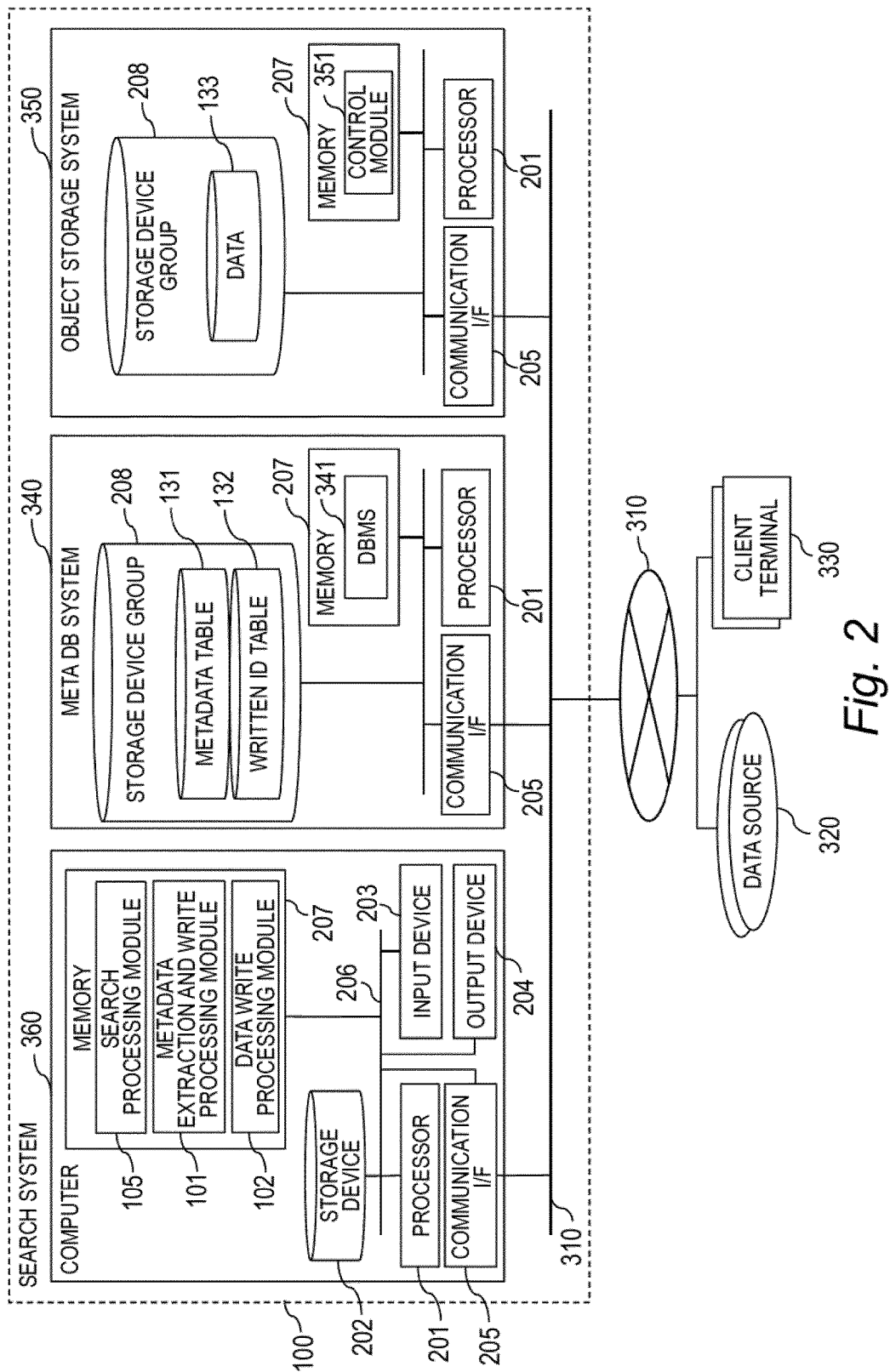
FIG. 2 is a block diagram for illustrating a hardware configuration example and a network connection relationship example of the search system 100.

FIG. 2 is a block diagram for illustrating a hardware configuration example and a network connection relationship example of the search system 100. The search system 100 includes a computer 360, a meta DB system 340, and an object storage system 350, and those are coupled to one another via a network 310.

The search system 100 is coupled to a data source 320 and a client terminal 330 via the network 310 such as a local area network (LAN), a wide area network (WAN), and the Internet. The data source 320 inputs a time-series data sequence D into the search system 100. For example, the data source 320 inputs the data sequence D illustrated in FIG. 1 into the search system 100. The client terminal 330 transmits a search request to the search system 100 and receives a search result from the search system 100. The types of search requests are a metadata count request and a data search request as illustrated in FIG. 1.

The computer 360 includes a processor 201, a storage device 202, an input device 203, an output device 204, a communication interface (IF) 205, and a memory 207. The processor 201, the storage device 202, the input device 203, the output device 204, the communication IF 205, and the memory 207 are coupled to one another via a bus 206. The processor 201 controls the computer 360. The memory 207 is a working area of the processor 201. The storage device 202 is a non-transitory recording medium for storing various programs and data. Examples of the storage device 202 and the memory 207 include a read only memory (ROM), a random access memory (RAM), a hard disk drive (HDD), and a flash memory.

The input device 203, the output device 204, and the communication IF 205 are each an interface for data input/output. The input device 203 inputs data. Examples of the input device 203 include a keyboard, a mouse, a touch panel, a numeric keypad, and a scanner. The output device 904 outputs data. Examples of the output device 204 include a display and a printer. The communication IF 205 is coupled to the network and transmits and receives data.

The functions of the metadata extraction and write processing module 101, the data write processing module 102, and the search processing module 105 illustrated in FIG. 1 are realized by the processor 201 executing programs stored in the memory 207.

The meta DB system 340 includes the processor 201, the memory 207, the communication IF 205, and a storage device group 208, and those are coupled to one another via the bus 206. The metadata table 131 and the written ID table 132 are stored in the storage device group 208, and the function of the meta DB system 340 is realized by the processor 201 executing a database management system (DBMS) 341 stored in the memory 207.

The object storage system 350 includes the processor 201, the memory 207, the communication IF 205, and the storage device group 208, and those are coupled to one another via the bus 206. Data 133 is stored in the storage device group 208, and the function of the object storage system 350 is realized by the processor 201 executing a control module 351 stored in the memory 207.

It should be noted that, in FIG. 2, the computer 360, the meta DB system 340, and the object storage system 350 each include one processor 201 and one memory 207, but those may each include a plurality of processors or memories. Further, the computer 360, the meta DB system 340, and the object storage system 350 may each be formed of a plurality of equipment including the processor 201, the memory 207, and the storage device 202 or the storage device group 208, and a part of devices such as the storage device group 208 may be shared with other equipment.

Further, in FIG. 2, the search processing module 105, the metadata extraction and write processing module 101, and the data write processing module 102 are included in the same computer 360, but a plurality of computers each including the processor 201, the memory 207, and the storage device 202 may include any one of or a plurality of the processing modules among the search processing module 105, the metadata extraction and write processing module 101, and the data write processing module 102.

Figure 24:
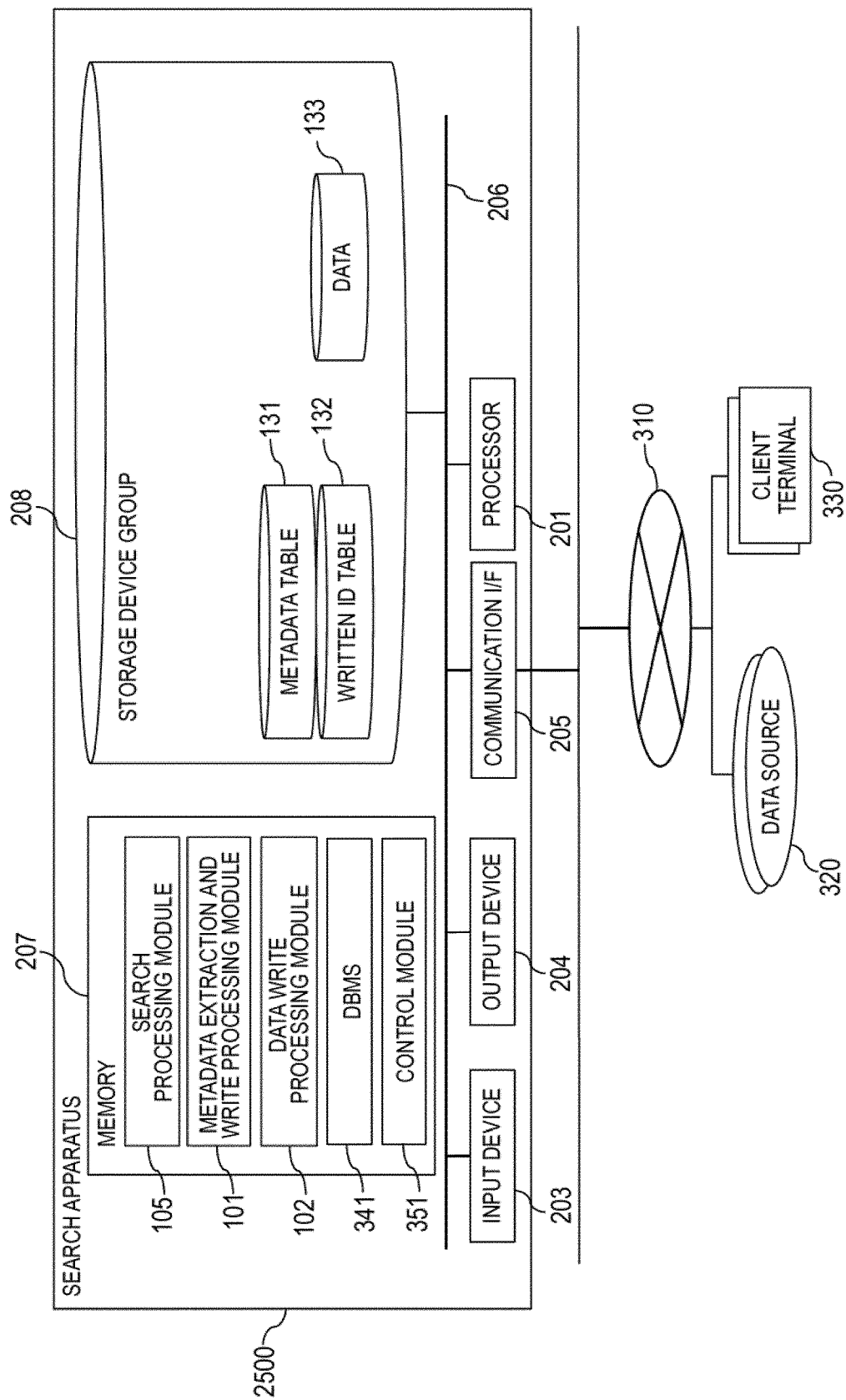
FIG. 24 is a block diagram for illustrating a configuration example of the search apparatus.

On the other hand, any one of or all of the search processing module 105, the metadata extraction and write processing module 101, the data write processing module 102, the meta DB 103, and the object storage 104 may operate on the same computer. For example, FIG. 24 is a configuration example of a case in which all the above are included in one search apparatus 2400.

A part or all of the metadata extraction and write processing module 101, the data write processing module 102, and the search processing module 105 may be realized by hardware, for example, by being implemented in an integrated circuit.

<Example of Counting Metadata>

Figure 3:
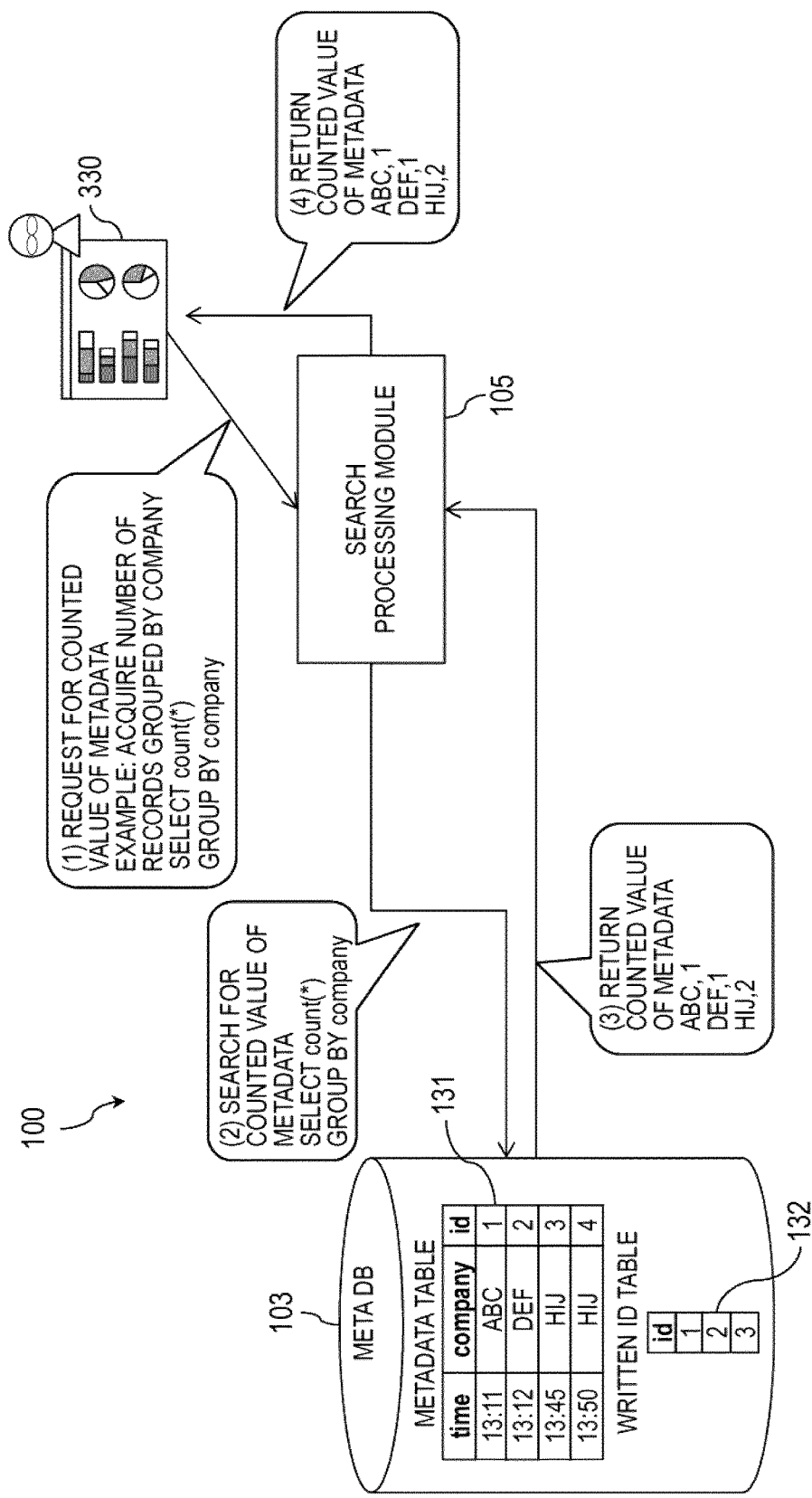
FIG. 3 is an explanatory diagram for illustrating an example of counting metadata.

FIG. 3 is an explanatory diagram for illustrating an example of counting metadata. (1) The search processing module 105 first receives a metadata count request from the client terminal 330. In this case, the search processing module 105 receives a metadata count request for each company name (company) as an example.

(2) Next, the search processing module 105 refers to the metadata table 131 to search for the number of metadata records for each company name in accordance with the metadata count request. (3) Then, the search processing module 105 retrieves a counted value of the metadata for each company name as a search result from the metadata table 131. In this example, one record of "ABC", one record of "DEF", and two records of "HIJ" are acquired as the search result. (4) Finally, the search processing module 105 returns the search result to the client terminal 330. Thus, the client terminal 330 can acquire the search result of the metadata without waiting for the data to be stored.

<Example of Data Search>

Figure 4:
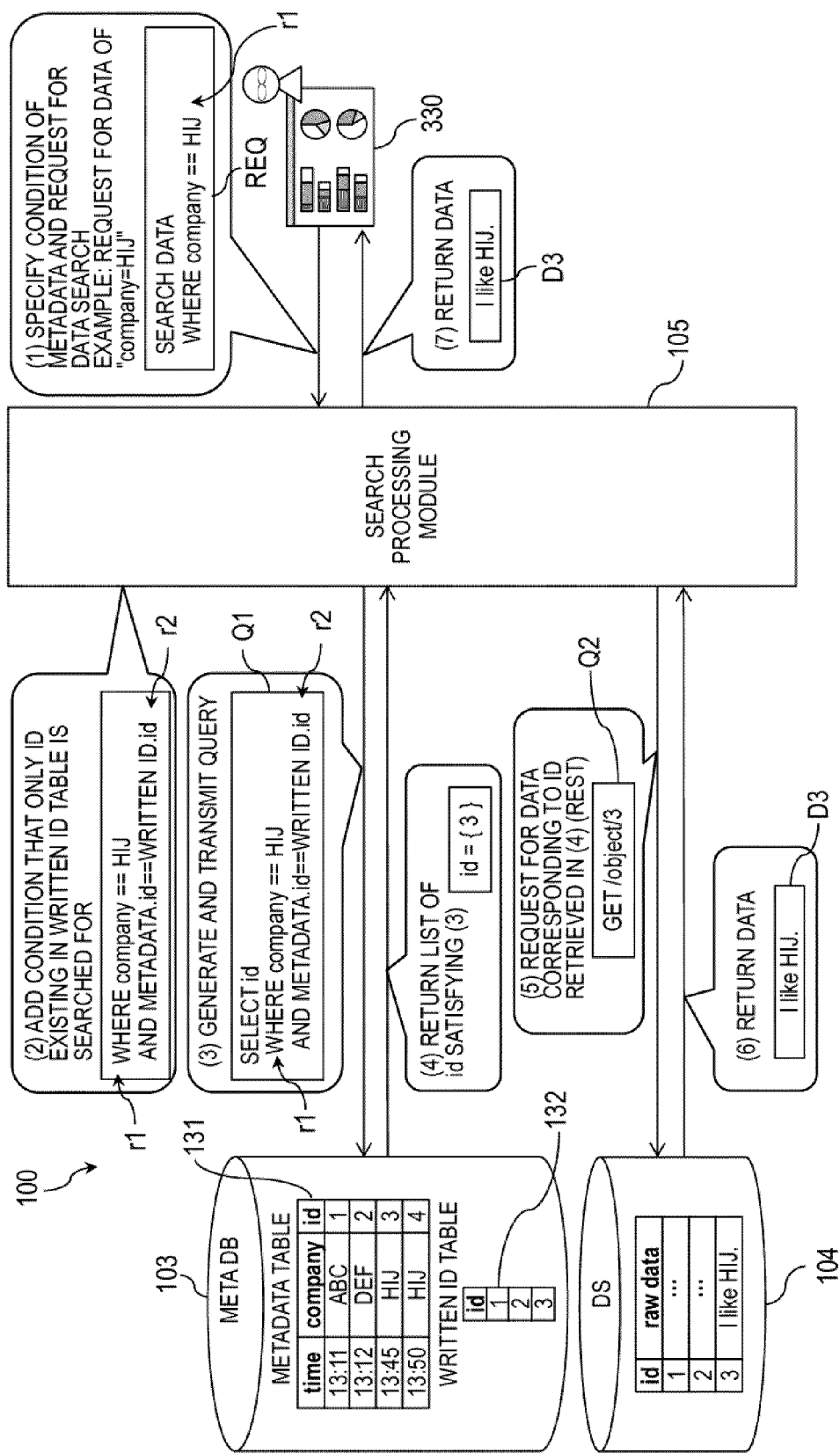
FIG. 4 is an explanatory diagram for illustrating an example of a data search.

FIG. 4 is an explanatory diagram for illustrating an example of a data search. (1) The search processing module 105 first receives a data search request from the client terminal 330. In this case, the search processing module 105 receives a data search request REQ including a search condition r1 specifying company=HIJ as the company name as an example.

(2) Next, the search processing module 105 adds, to the search condition r1, a search condition r2 for searching for only the IDs present in the written ID table 132. Thus, the search condition is r1 AND r2. (3) Then, the search processing module 105 generates a query Q1 including the search condition obtained in (2) and searches the metadata table 131.

(4) As a result, the search processing module 105 retrieves id=3 from the meta DB 103 as an ID for which "HIJ" is included in the metadata table 131 and which is stored in the written ID table 132. (5) Then, the search processing module 105 transmits a retrieval request Q2 of data corresponding to id=3 to the object storage 104. (6) The search processing module 105 retrieves "I like HIJ.", which is the data D3 having id=3, from the object storage 104.

(7) Then, the search processing module 105 returns the retrieved data D3 to the client. Thus, the search processing module 105, which searches the meta DB 103 using a query with the search condition r2 added, can exclude the ID (id=4) having "HIJ" as its company name from data to be searched for. Therefore, the search processing module 105 can avoid the search error caused by searching for data that is not stored in the object storage 104.

<Example of Functional Configuration of Search System 100>

Figure 5:
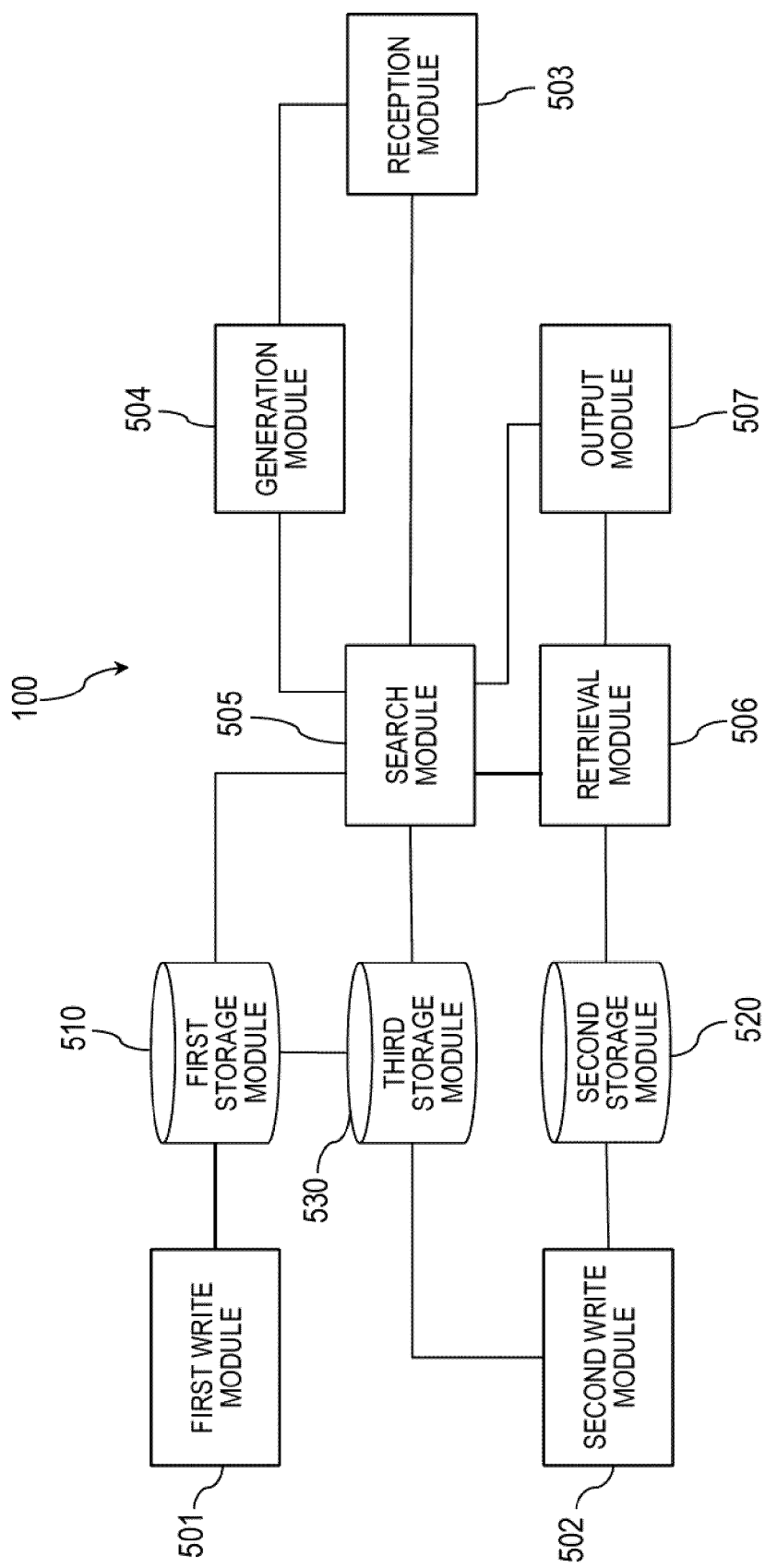
FIG. 5 is a block diagram for illustrating an example of a functional configuration of the search system.

FIG. 5 is a block diagram for illustrating an example of a functional configuration of the search system 100. The search system 100 includes a first write module 501, a second write module 502, a reception module 503, a generation module 504, a search module 505, a retrieval module 506, and an output module 507. Specifically, for example, the functions of the first write module 501 to the output module 507 are realized by the processor 201 executing programs stored in the storage device 202 illustrated in FIG. 2. Specifically, for example, the functions of a first storage module 510 to a third storage module 530 are realized by the storage device 202 illustrated in FIG. 2 or the storage device 202 coupled via the communication IF 205 and external to the search system 100.

The first storage module 510 corresponds to the metadata table 131, the second storage module 520 corresponds to the object storage 104, and the third storage module 530 corresponds to the written ID table 132. It should be noted that the first storage module 510 and the third storage module 530 are not necessarily required to be tables, and may be lists, databases, or queues, or may be represented by other types of information than those data structures. Further, the second storage module 520 is not necessarily required to be a database, and may be a table, a list, or a que, or may be represented by other types of information than those data structures.

The first write module 501 extracts metadata from data in input order for each data of the data sequence D input through an interface and writes the metadata in the first storage module 510 in association with identification information uniquely identifying the data. The interface is, for example, the input device 203 or the communication IF 205 illustrated in FIG. 2. The identification information uniquely identifying the data is the ID as a part of the metadata illustrated in FIG. 1. Specifically, for example, the first write module 501 corresponds to the metadata extraction and write processing module 101 illustrated in FIG. 1. Therefore, when extracting metadata, the first write module 501 refers to information such as the dictionary data and then extracts corresponding metadata from data other than the case in which the first write module 501 directly extracts metadata from data.

The second write module 502 writes each data in the data sequence D into the second storage module 520 in input order in association with the identification information uniquely identifying the data. Further, the second write module 502 writes the identification information uniquely identifying the data that is written into the second storage module 520 into the third storage module 530. Specifically, for example, the processing of the second write module 502 corresponds to the processing of the data write processing module 102 illustrated in FIG. 1. In other words, the second write module 502 executes the processing of the data write processing module 102 in parallel with the extraction and writing of metadata by the first write module 501.

The reception module 503 receives a search request including a search condition of search target data through an interface. Specifically, for example, the reception module 503 receives the count request illustrated in FIG. 3 or the data search request illustrated in FIG. 4 from the client terminal 330 through the interface. In the case of the count request illustrated in FIG. 3, the counted value for each company (SELECT count(*) GROUP BY company) corresponds to the search condition. Further, in the case of the data search request illustrated in FIG. 4, the company name (company=HIJ) is the search condition.

The search module 505 searches a search destination that is selected from the first storage module 510 and the third storage module 530 in accordance with the search request received by the reception module 503 for identification information corresponding to the first search condition. Specifically, for example, when the search request is a count request to count the number of pieces of identification information grouped by information corresponding to the first search condition, the search module 505 selects the metadata table 131, which is the first storage module 510, as the search destination, and counts the number of pieces of identification information grouped by the information corresponding to the first search condition. For example, when the first search condition is "company", the search module 505 counts the number of pieces of identification information grouped by "ABC", "DEF", and "HIJ", which are information corresponding to "company".

On the other hand, when the search request is a data search request, the search module 505 searches the metadata table 131, which is the first storage module 510, and the written ID table 132, which is the third storage module 530, as the search destinations. In this case, the search module 505 executes the search using inquiry information generated by the generation module 504 described below.

When the search request is a request to search for the search target data, the generation module 504 generates inquiry information including the first search condition and the second search condition indicating that the identification information uniquely identifying the data is already written into the third storage module 530. The second search condition is a condition indicating that the ID uniquely identifying the data is already written into the written ID table 132, which is the third storage module 530. For example, the second search condition is the search condition r2 illustrated in (3) of FIG. 4. The generation module 504 generates the query Q1, which is the logical product of the first search condition and the second search condition, as the inquiry information.

In this case, the search module 505 transmits the inquiry information to the meta DB 103, and searches for identification information satisfying the first search condition in the first storage module 510 and satisfying the second search condition in the third storage module 530. For example, in the example of FIG. 4, the search module 505 searches for IDs satisfying "company==HIJ" in the metadata table 131, which is the first search condition r1, and satisfying "metadata.id==written ID.id" in the written ID table 132, which is the second search condition r2. In the example of FIG. 4, id=3 is retrieved. This avoids the search error caused by searching for data that is not stored in the object storage 104.

The output module 507 outputs the search result retrieved by the search processing module 105 through an interface. The interface in this case is the output device 204 or the communication IF 205 illustrated in FIG. 2. Thus, the output destination is the output device 204 or the client terminal 330 as the search requestor. Further, when the search request is a metadata count request, the output module 507 outputs the count result as the search result. On the other hand, when the search request is a data search request, the output module 507 outputs the ID as the search result of the search module 505. Further, the retrieval module 506 described below may retrieve data uniquely identified by the ID as the search result and the output module 507 may output the retrieved data.

The retrieval module 506 retrieves data identified by the identification information, which is the search result retrieved by the search module 505, from the second storage module 520. Specifically, for example, the retrieval module 506 transmits the ID as the search result to the object storage 104, and retrieves the data corresponding to the transmitted ID from the object storage 104. When the ID as the search result is "id=3", "I like HIJ", which is the data D3, is retrieved. In this case, the output module 507 outputs the data D3 retrieved by the retrieval module 506.

<Example of Metadata Table 131>

Figure 6:
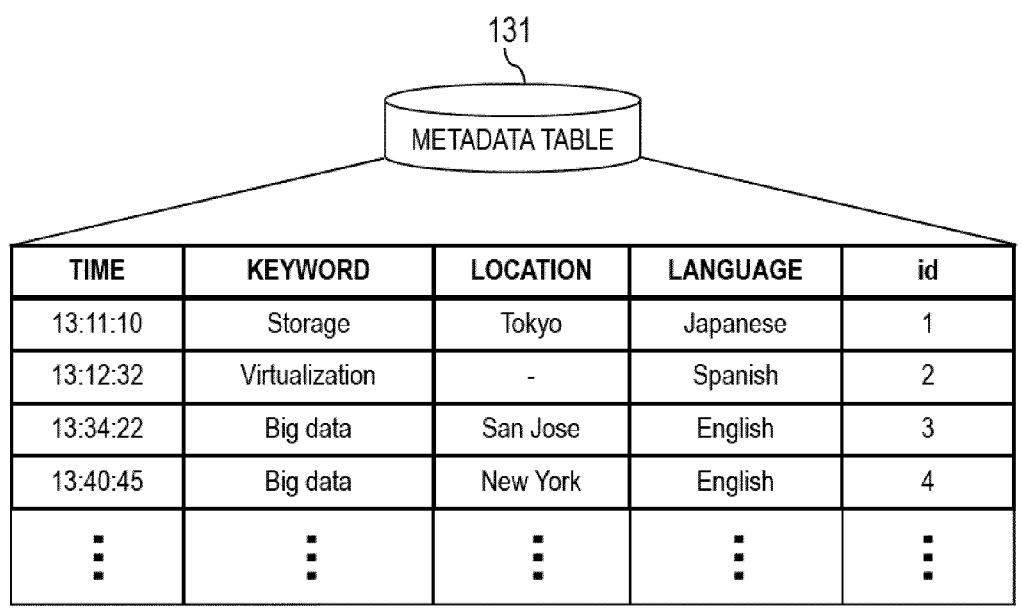
FIG. 6 is an explanatory diagram for showing an example of the metadata table according to the first embodiment.

FIG. 6 is an explanatory diagram for showing an example of the metadata table 131 according to the first embodiment. In the example of FIG. 6, a time, a keyword, a location, a language, and an id are written as metadata for each data. The time and the id are metadata included in data, and the keyword, the location, and the language are metadata extracted from data by the first write module 501 analyzing the data.

<Example of Object Storage 104>

Figure 7:
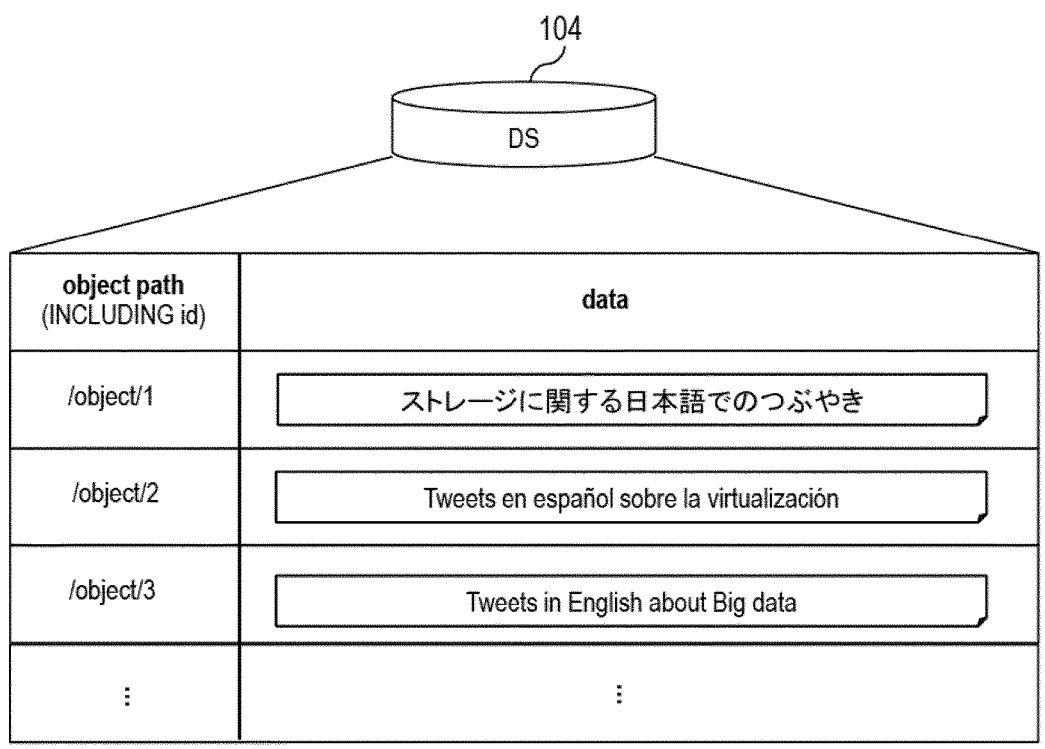
FIG. 7 is an explanatory diagram for showing an example of the object storage according to the first embodiment.

FIG. 7 is an explanatory diagram for showing an example of the object storage 104 according to the first embodiment. The object storage 104 stores data for each file path. The file path is metadata, and is information uniquely identifying a location where the data is stored. It should be noted that the last number of the file path is the ID.

<Example of Written ID Table 132>

Figure 8:
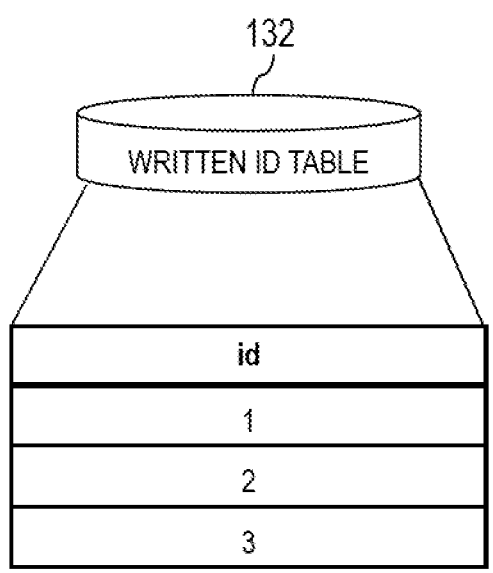
FIG. 8 is an explanatory diagram for showing an example of the written ID table according to the first embodiment.

FIG. 8 is an explanatory diagram for showing an example of the written ID table 132 according to the first embodiment. The written ID table 132 is a table into which the id is written. The data corresponding to the ID written into the written ID table 132 is the data already stored in the object storage 104.

<Example of Processing Procedure of Metadata Extraction and Write Processing Module 101>

Figure 9:
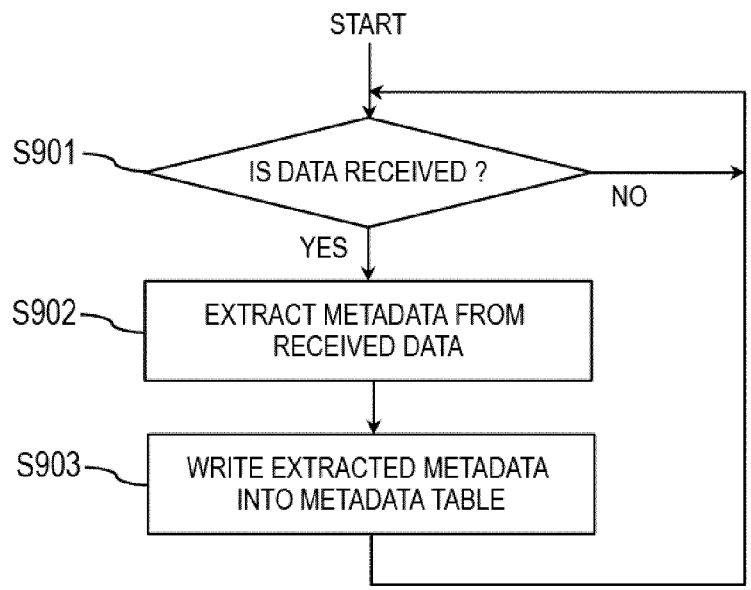
FIG. 9 is a flowchart for illustrating an example of a processing procedure of the metadata extraction and write processing module executed by the search system.

FIG. 9 is a flowchart for illustrating an example of a processing procedure of the metadata extraction and write processing module 101 executed by the search system 100. First, the search system 100 waits for the first write module 501 to receive data (Step S901: No). When the first write module 501 receives data (Step S901: Yes), the search system 100 extracts metadata from the received data (Step S902). Then, the search system 100 writes the extracted metadata into the metadata table 131 through use of the first write module 501 (Step S903), and returns to Step S901. Thus, an entry corresponding to the data is added to the metadata table 131.

<Example of Processing Procedure of Data Write Processing Module 102>

Figure 10:
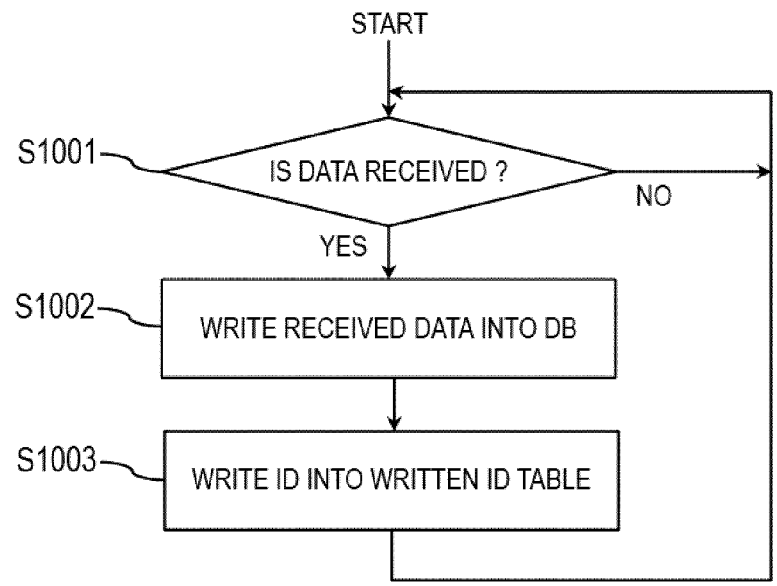
FIG. 10 is a flowchart for illustrating an example of a processing procedure of the data write processing module executed by the search system.

FIG. 10 is a flowchart for illustrating an example of a processing procedure of the data write processing module 102 executed by the search system 100. First, the search system 100 waits for the second write module 502 to receive data (Step S1001: No). When the second write module 502 receives data (Step S1001: Yes), the search system 100 writes the received data into the object storage 104 (Step S1002). Then, the search system 100 writes the ID uniquely identifying the written data into the written ID table 132 through use of the second write module 502 (Step S1003), and returns to Step S1001. Thus, entries corresponding to the data are added to the object storage 104 and the written ID table 132, respectively.

<Example of Processing Procedure of Search Processing Module 105>

Figure 11:
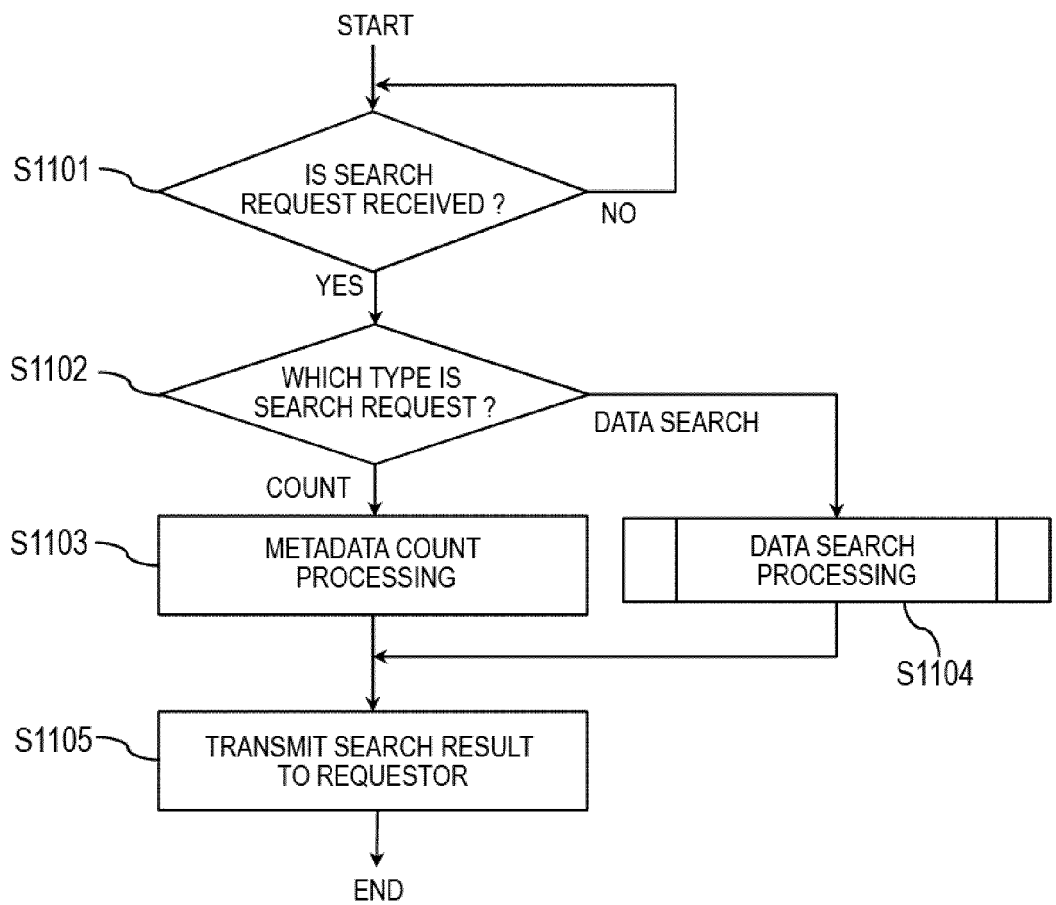
FIG. 11 is a flowchart for illustrating an example of a processing procedure of the search processing module 105 executed by the search system 100.

FIG. 11 is a flowchart for illustrating an example of a processing procedure of the search processing module 105 executed by the search system 100. First, the search system 100 waits for the reception module 503 to receive a search request (Step S1101: No). When the reception module 503 receives a search request (Step S1101: Yes), the search system 100 determines whether the type of the received search request is the metadata count or the data search (Step S1102). When the received search request is the metadata count (Step S1102: count), the search system 100 executes metadata count processing (Step S1103), and transmits the search result to the client terminal 330 as the requestor of the search request (Step S1105). In the metadata count processing (Step S1103), as illustrated in FIG. 3, the search system 100 transmits the search request to the meta DB 103, and acquires a count result conforming to the search condition from the meta DB 103.

On the other hand, when the received search request is the data search (Step S1102: data search), the search system 100 executes the data search processing (Step S1104), and transmits the search result to the client terminal 330 as the requestor of the search request (Step S1105).

Figure 12:
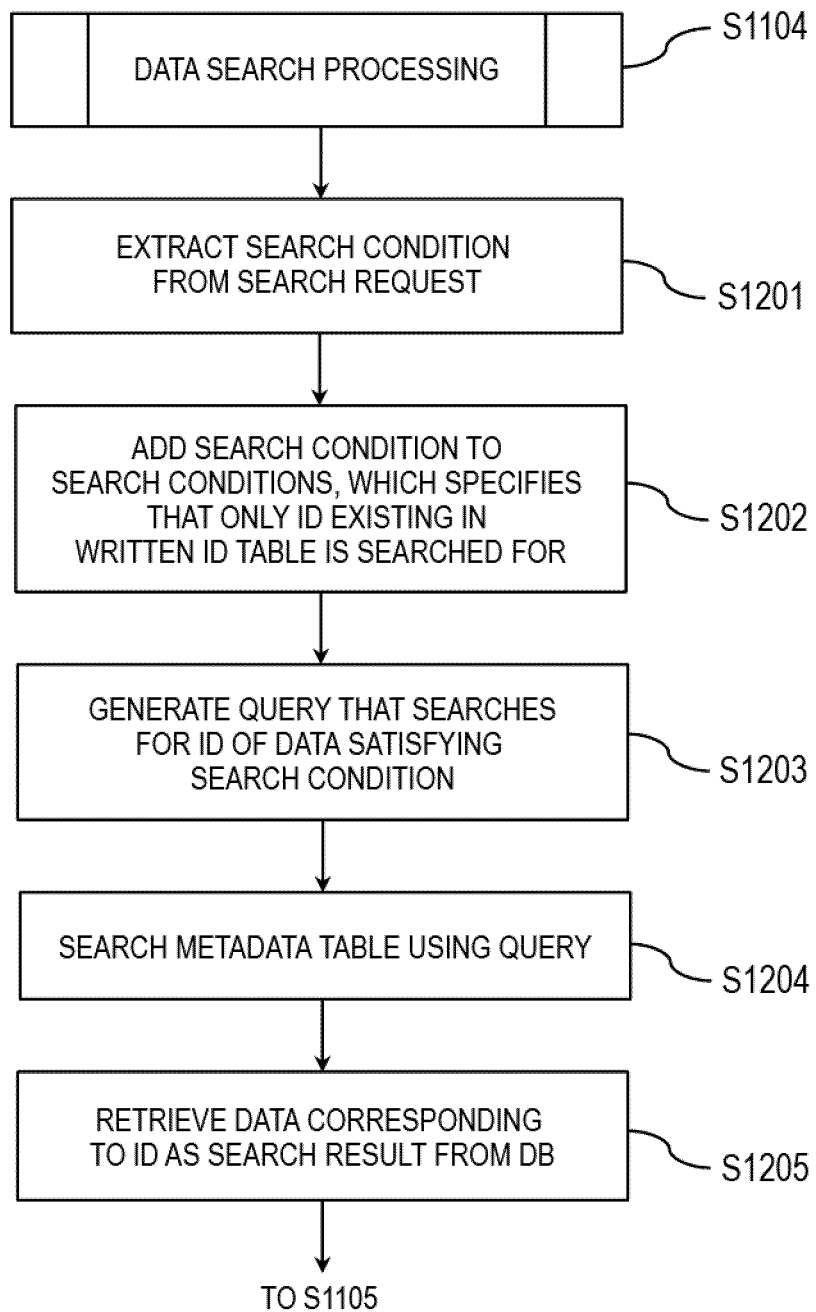
FIG. 12 is a flowchart for illustrating an example of a detailed processing procedure of the data search processing (Step S1104) illustrated in FIG. 11.

FIG. 12 is a flowchart for illustrating an example of a detailed processing procedure of the data search processing (Step S1104) illustrated in FIG. 11. First, the search system 100 extracts the search condition r1 from the search request (Step S1201). Next, the search system 100 adds, to the search condition r1, the search condition r2 for searching for only the IDs present in the written ID table 132 (Step S1202). Then, the search system 100 generates the query Q1 for searching for IDs of data satisfying the search condition r1 and the search condition r2 (Step S1203).

After that, the search system 100 searches the metadata table 131 using the generated query Q1 (Step S1204), and retrieves the data corresponding to the ID as the search result from the object storage 104 (Step S1205). Then, the search system 100 ends the data search processing (Step S1104), and returns to Step S1105.

In this manner, according to the first embodiment, the search system 100 executes the extraction and writing of metadata and the writing of data in parallel, and hence the metadata is written into the metadata table 131 without waiting for the data as its extraction source to be written. Therefore, the search system 100 can execute the count processing using only the metadata table 131 in real time without waiting for the data to be written.

Further, the target of the data search is data already written at the time of the search. This avoids the error indicating non-presence of data associated with the metadata. Further, it is possible to write and count only the metadata ahead of the data, and hence the performance of extraction and writing of metadata is not affected by the performance of storing of data. This enables the search processing module 105 to improve the real time performance of for data and its metadata that are written in parallel.

Second Embodiment

Next, a description is given of a second embodiment of this invention. The same contents as those of the first embodiment are denoted by the same reference symbols, and the description thereof is omitted. The second embodiment is an example in which merge processing of merging the written ID table 132 is added to the first embodiment. The written ID table 132 stores as many written IDs as the number of data records. Thus, when pieces of data are consecutively input, the usage area of the written ID table 132 increases in proportion to the number of data writes.

Therefore, in the second embodiment, the written ID table 132 is merged in cooperation with the metadata table 131 regularly or irregularly. This suppresses the increase of the usage area of the written ID table 132 to thereby achieve saving memories.

<Example of Merge Processing>

Figure 13:
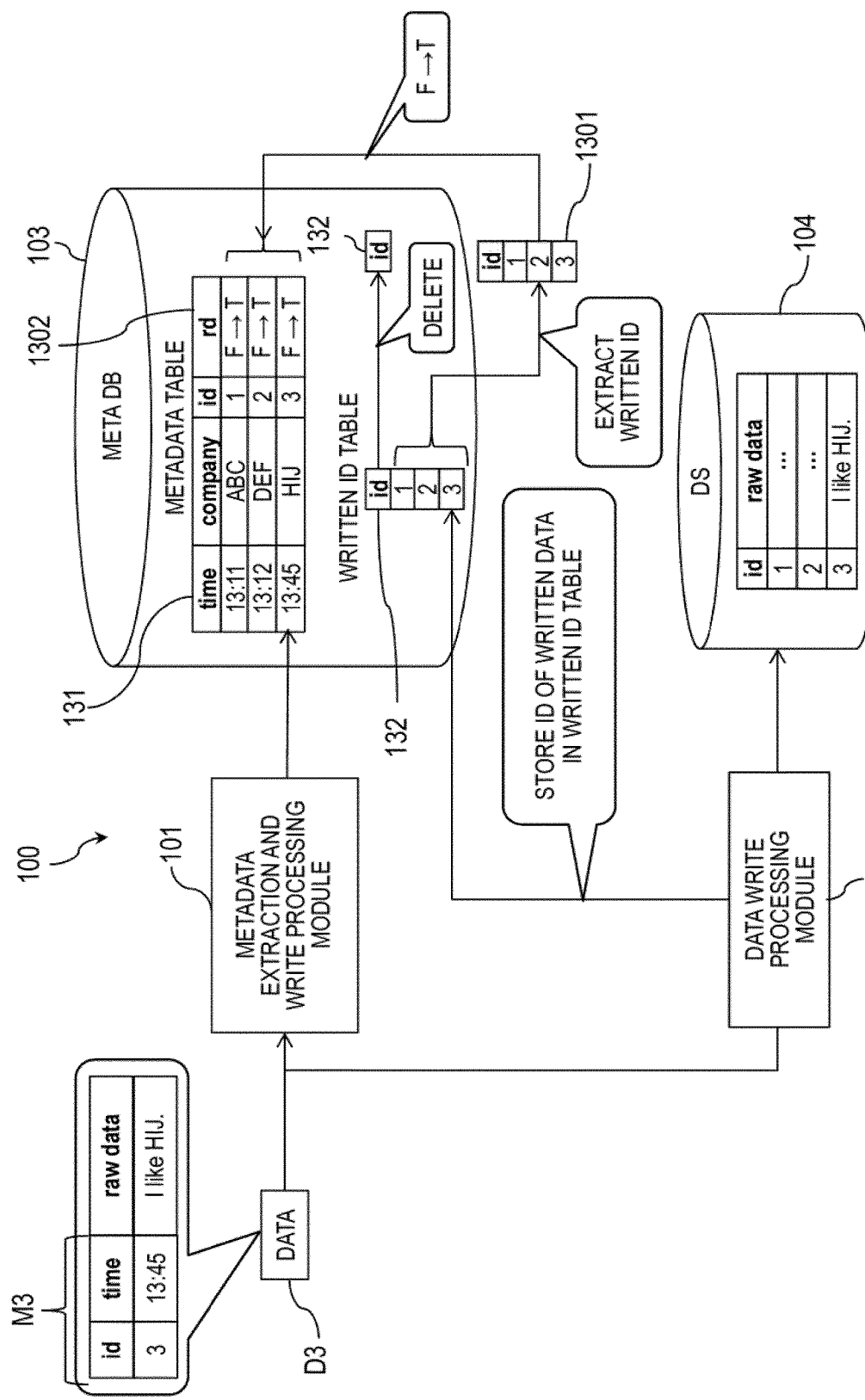
FIG. 13 is an explanatory diagram for illustrating an example of merge processing of the written ID table according to the second embodiment.

FIG. 13 is an explanatory diagram for illustrating an example of merge processing of the written ID table 132 according to the second embodiment. In FIG. 13, it is assumed that the data D3 is input, the metadata extraction and write processing module 101 writes the metadata M3 into the metadata table 131, the data write processing module 102 writes the data into the object storage 104, and the ID is written into the written ID table 132.

It should be noted that, in the second embodiment, an rd column 1302 is added to the metadata table 131. The rd column 1302 indicates presence of data in the object storage 104, and an initial value of the rd column 1302 is "F". The value "F" indicates that it is impossible to confirm, in the metadata table 131, whether or not the data corresponding to the metadata is stored in the object storage 104. On the other hand, when the value of the rd column 1302 is updated to "T", it is possible to confirm, in the metadata table 131, that the data corresponding to the metadata is stored in the object storage 104.

The search system 100 extracts a written ID from the written ID table 132 regularly or irregularly. A written ID to be extracted may be any one of written IDs or all of the written IDs. In FIG. 13, it is assumed that the written ID table 132 stores id=1, 2, 3 and an ID list 1301, which includes all the IDs id=1, 2, 3, is extracted.

The search system 100 identifies entries that each have the same ID with a written ID in the extracted ID list 1301, and updates the values of the rd columns 1302 of the identified entries from "F" to "T". Then, the search system 100 deletes the IDs of the ID list 1301 from the written ID table 132.

In this manner, even when IDs are not present in the written ID table 132, it is possible to confirm that the data is already written into the object storage 104 by referring to the value of the rd column 1302 of the metadata table 131, and hence there is no problem with deletion of IDs from the written ID table 132. Accordingly, it is possible to achieve saving memories of the written ID table 132. Further, memory usage increases in the metadata table 131 by only one column, and hence it is possible to achieve reduction of memory usage from the perspective of the entire meta DB 103.

<Example of Data Search>

Figure 14:
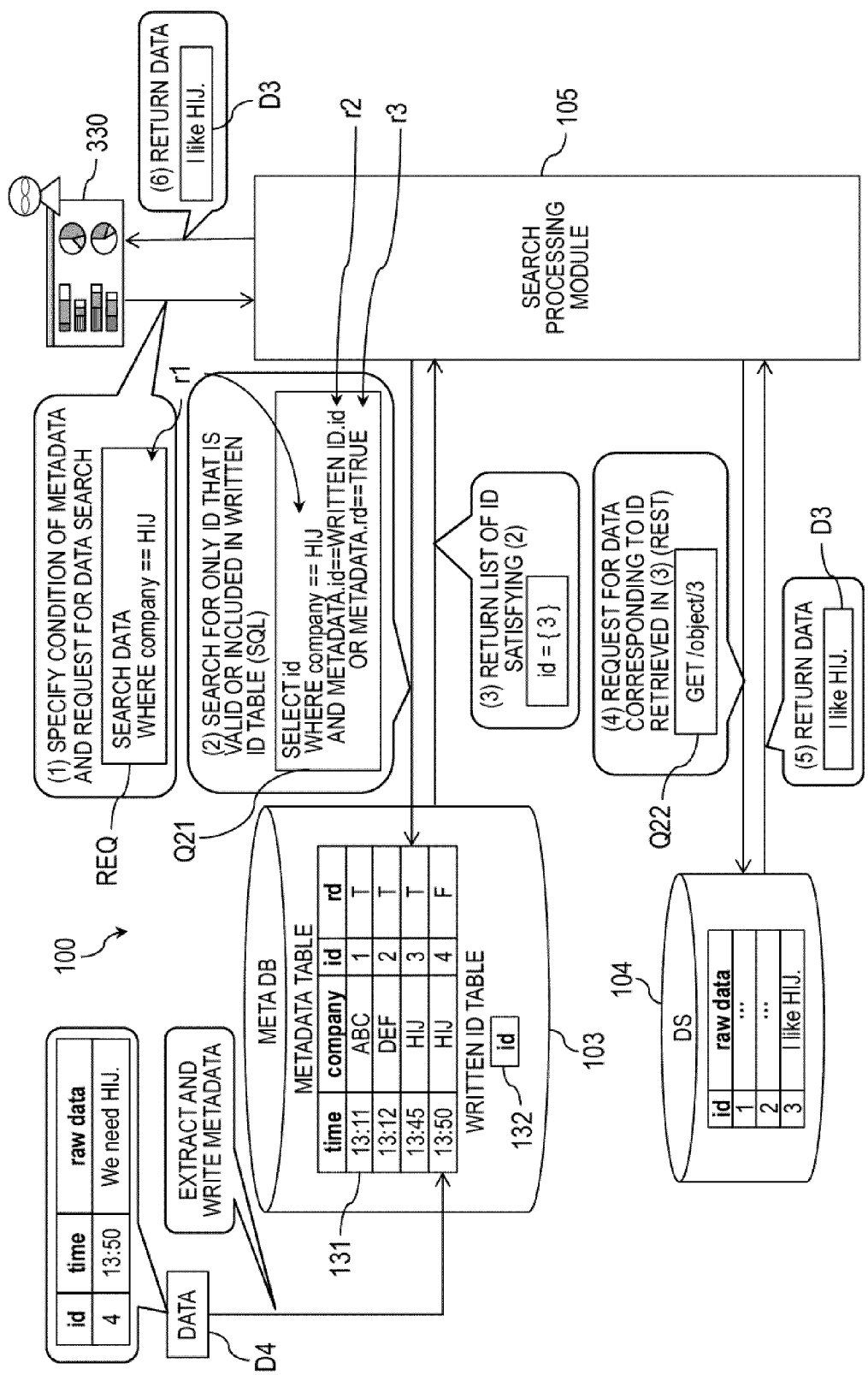
FIG. 14 is an explanatory diagram for illustrating an example of a data search according to the second embodiment.

FIG. 14 is an explanatory diagram for illustrating an example of a data search according to the second embodiment. In FIG. 14, it is assumed that the data D4 is input under the state in which the merge processing is completed in the written ID table 132 of FIG. 13, the metadata M4 of the data D4 is stored in the metadata table 131, and the data D4 is not written into the object storage 104 yet.

(1) The search processing module 105 first receives a data search request from the client terminal 330. In this case, the search processing module 105 receives the search request REQ including the search condition r1 specifying company=HIJ as the company name as an example.

(2) Next, the search processing module 105 adds, to the search condition r1, the search condition r2 for searching for the IDs present in the written ID table 132, or a search condition r3 for searching for an ID for which the value of the rd column 1302 is T. Thus, the search condition is r1 AND (r2 OR r3). (3) Then, the search processing module 105 generates a query Q21 including the search condition r1 AND (r2 OR r3) and searches the metadata table 131.

(3) As a result, the search processing module 105 retrieves id=3 from the meta DB 103 as an ID for which "HIJ" is included in the metadata table 131 and which is stored in the written ID table 132. In other words, there is no hit for the search condition r2 because the written ID table 132 is empty whereas there is a hit of id=3 as an ID satisfying the search condition r1 and the search condition r3.

(4) Then, the search processing module 105 transmits a retrieval request Q22 of data corresponding to id=3 to the object storage 104. (5) The search processing module 105 retrieves "I like HIJ.", which is the data D3 having id=3, from the object storage 104. (6) Then, the search processing module 105 returns the retrieved data D3 to the client. In this manner, even when IDs are not present in the written ID table 132, it is possible to search for the metadata as in the same way with the first embodiment by referring to the value of the rd column 1302 of the metadata table 131.

<Example of Functional Configuration of Search System 100>

Figure 15:
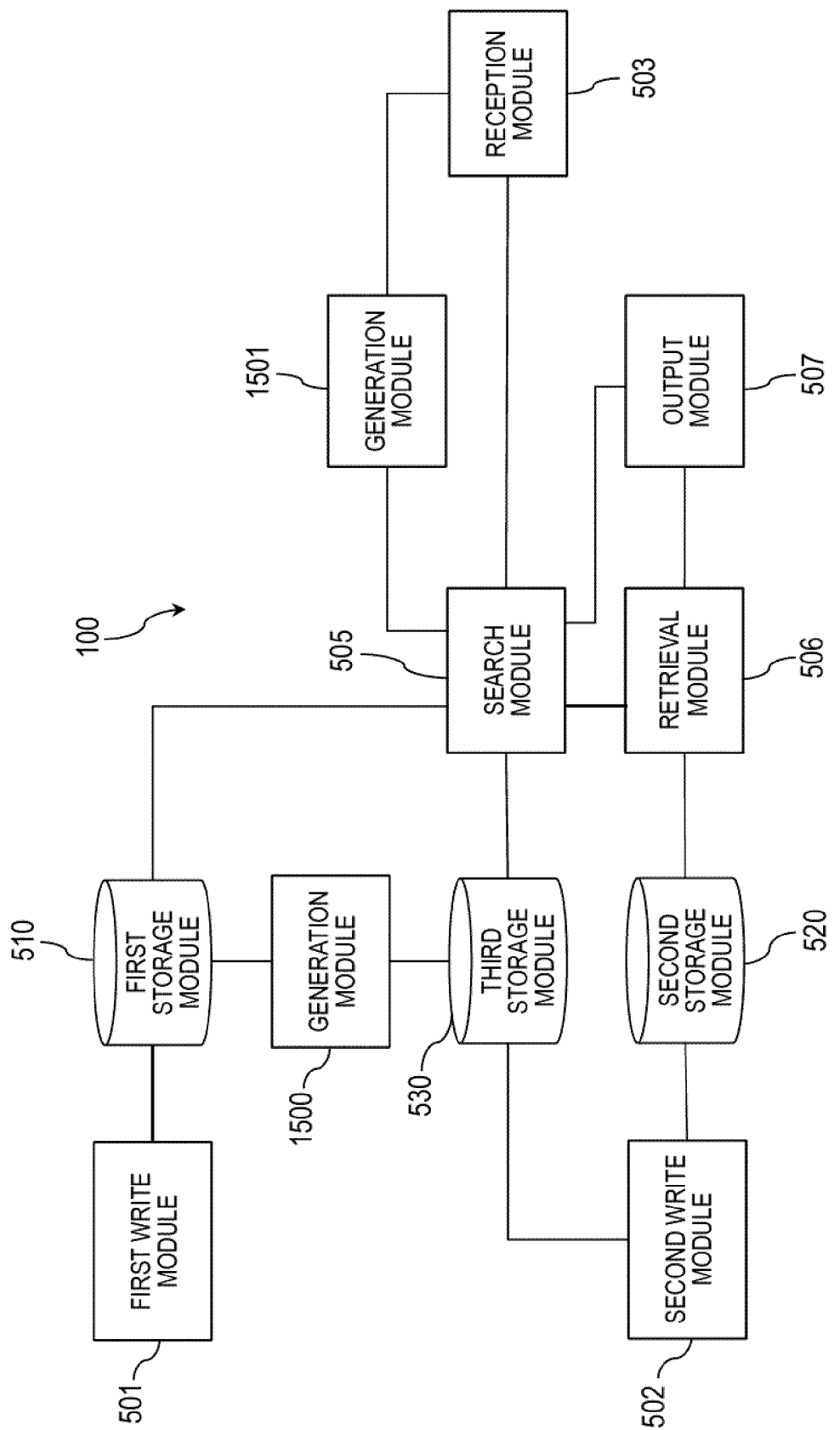
FIG. 15 is a block diagram for illustrating an example of a functional configuration of the search system according to the second embodiment.

FIG. 15 is a block diagram for illustrating an example of a functional configuration of the search system 100 according to the second embodiment. The search system 100 according to the second embodiment has a configuration in which a merge processing module 1500 is added to the search system 100 described in the first embodiment. Specifically, for example, the function of the merge processing module 1500 is realized by the processor 201 executing programs stored in the storage device 202 illustrated in FIG. 2.

Figure 16:
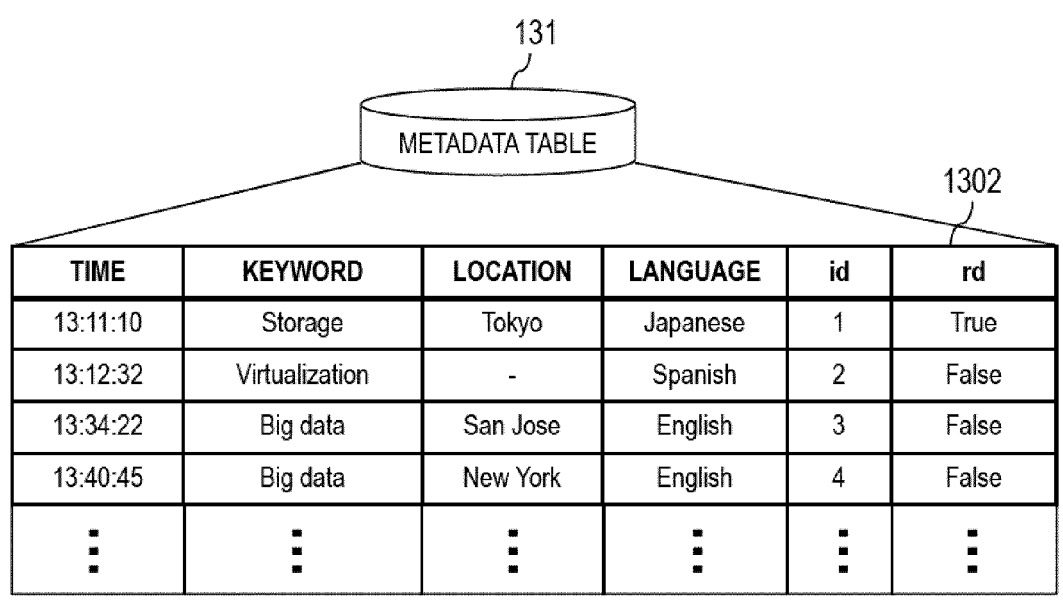
FIG. 16 is an explanatory diagram for showing an example of the metadata table according to the second embodiment.

FIG. 16 is an explanatory diagram for showing an example of the metadata table 131 according to the second embodiment. In the example of FIG. 16, as metadata for each data, the rd column 1302 is added in addition to the columns of the time, the keyword, the location, the language, and the id shown in FIG. 6. As described above, the rd column 1302 indicates the presence of data in the object storage 104, and the initial value of the rd column 1302 is "F".

Figure 17:
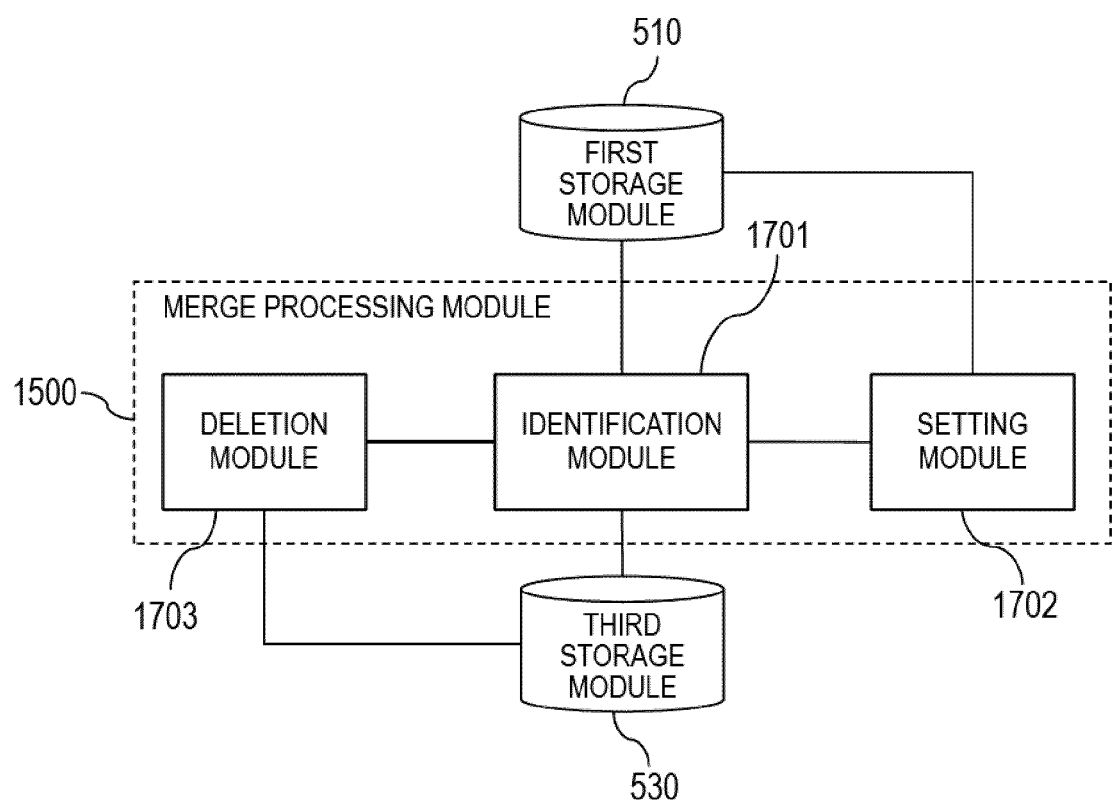
FIG. 17 is a block diagram for illustrating an example of a detailed functional configuration of the merge processing module illustrated in FIG. 15.

FIG. 17 is a block diagram for illustrating an example of a detailed functional configuration of the merge processing module 1500 illustrated in FIG. 15. In FIG. 17, the merge processing module 1500 includes an identification module 1701, a setting module 1702, and a deletion module 1703. The identification module 1701 identifies, in the first storage module 510, metadata associated with any one of the pieces of identification information written into the third storage module 530. Specifically, for example, the identification module 1701 identifies, in the metadata table 131, metadata associated with any one of the IDs in the written ID table 132. For example, in FIG. 13, the identification module 1701 identifies, in the metadata table 131, metadata associated with id=3 as an ID in the written ID table 132. In this case, the entry having id=3 in the third row is identified.

The setting module 1702 sets write completion information indicating that data associated with the metadata identified in the first storage module 510 by the identification module 1701 is already written into the second storage module 520. Specifically, for example, the setting module 1702 updates the value of the rd column 1302 from "F" to "T", which indicates that the data D3 associated with the metadata of id=3 identified by the identification module 1701 is already written into the object storage 104. Thus, it is possible to confirm, in the metadata table 131, that data associated with its metadata is stored in the object storage 104.

The deletion module 1703 deletes any one of the pieces of identification information from the third storage module 530 when the write completion information is set by the setting module 1702. Specifically, for example, the deletion module 1703 deletes the IDs identified by entries whose values of the rd columns 1302 have been updated from "F" to "T" from the written ID table 132. For example, as illustrated in FIG. 14, the deletion module 1703 deletes id=1, 2, 3 from the written ID table 132.

A generation module 1601 generates inquiry information when the search request is a request to search for the search target data. The inquiry information includes the first search condition r1, the second search condition r2 indicating that the identification information for uniquely identifying data is already written into the third storage module 530, and the third search condition indicating that the data is already written into the second storage module 520. In addition, the inquiry information is information for searching for identification information satisfying both the first search condition r1, and the second search condition r2 or the third search condition r3. This inquiry information is the query Q21 illustrated in FIG. 14.

<Example of Merge Processing Procedure of Written ID Table 132>

Figure 18:
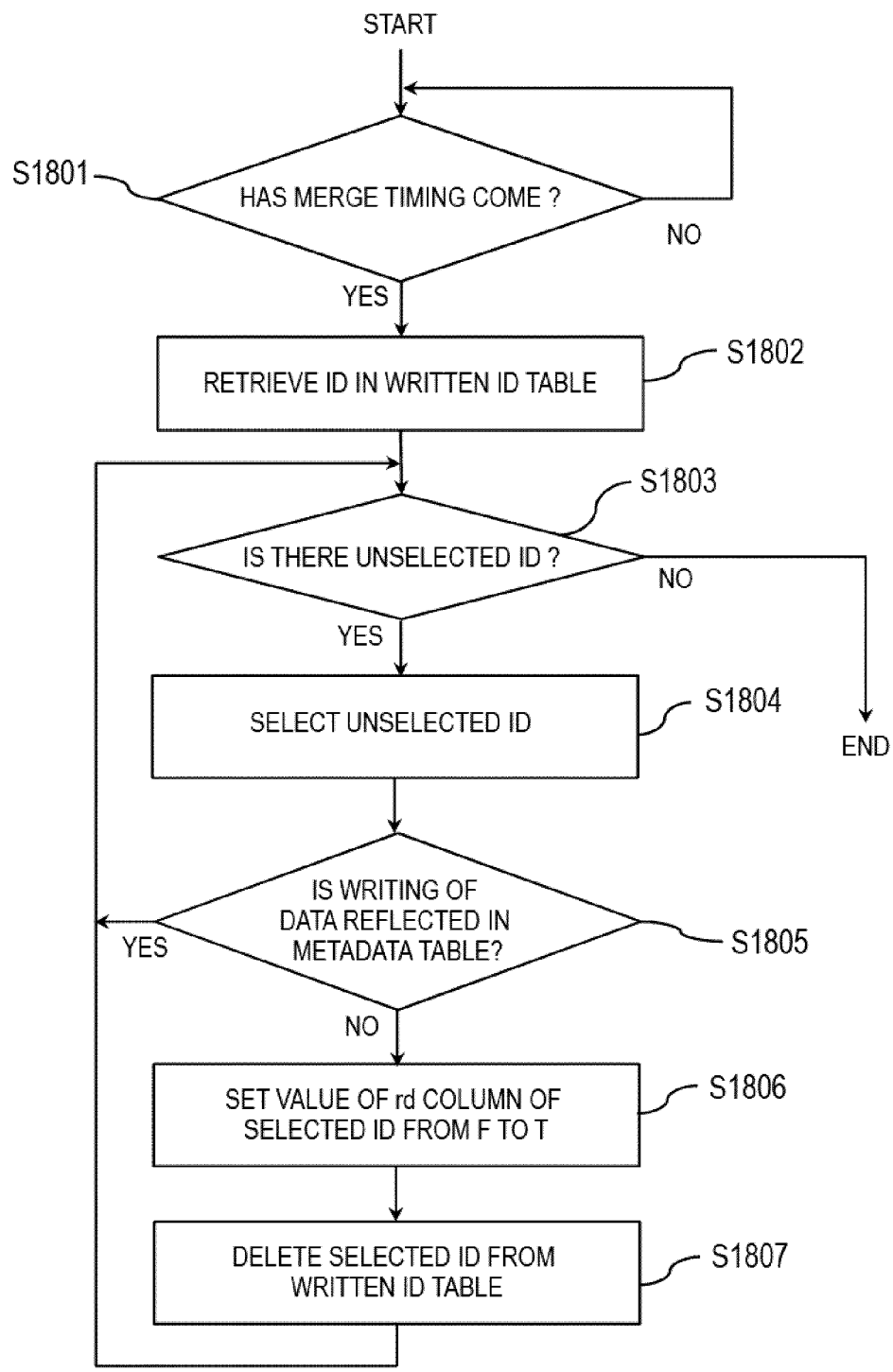
FIG. 18 is a flowchart for illustrating a merge processing procedure of the written ID table.

FIG. 18 is a flowchart for illustrating a merge processing procedure of the written ID table 132. First, the search system 100 waits for a merge timing to come (Step S1801: No), and when the merge timing has come (Step S1801: Yes), the search system 100 retrieves IDs in the written ID table 132 (Step S1802). Next, the search system 100 determines whether or not there is an unselected ID among the IDs retrieved in Step S1802 (Step S1803).

When there is an unselected ID (Step S1803: Yes), the search system 100 selects the unselected ID (Step S1804). Then, the search system 100 determines whether or not the metadata table 131 has reflected the fact that the data corresponding to the selected ID is already written into the object storage 104 (Step S1805). Specifically, the search system 100 determines whether or not the value of the rd column 1302 corresponding to the selected ID is T.

When the above-mentioned fact is reflected (Step S1805: Yes), the search system 100 returns to Step S1803. When the above-mentioned fact is not reflected (Step S1805: No), the search system 100 updates the value of the rd column 1302 corresponding to the selected ID from "F" to "T" (Step S1806). Then, the search system 100 deletes the selected ID from the written ID table 132 (Step S1807), and returns to Step S1803. In Step S1803, when there is no unselected ID (Step S1803: No), the merge processing ends.

<Example of Processing Procedure of Search Processing Module 105>

Next, a description is given of an example of a processing procedure of the search processing module 105 executed by the search system 100. The processing of the search processing module 105 according to the second embodiment is the same as the processing of the search processing module 105 illustrated in FIG. 11, but is different in the data search processing (Step S1104). Therefore, only the data search processing (Step S1104) is described in the second embodiment.

Figure 19:
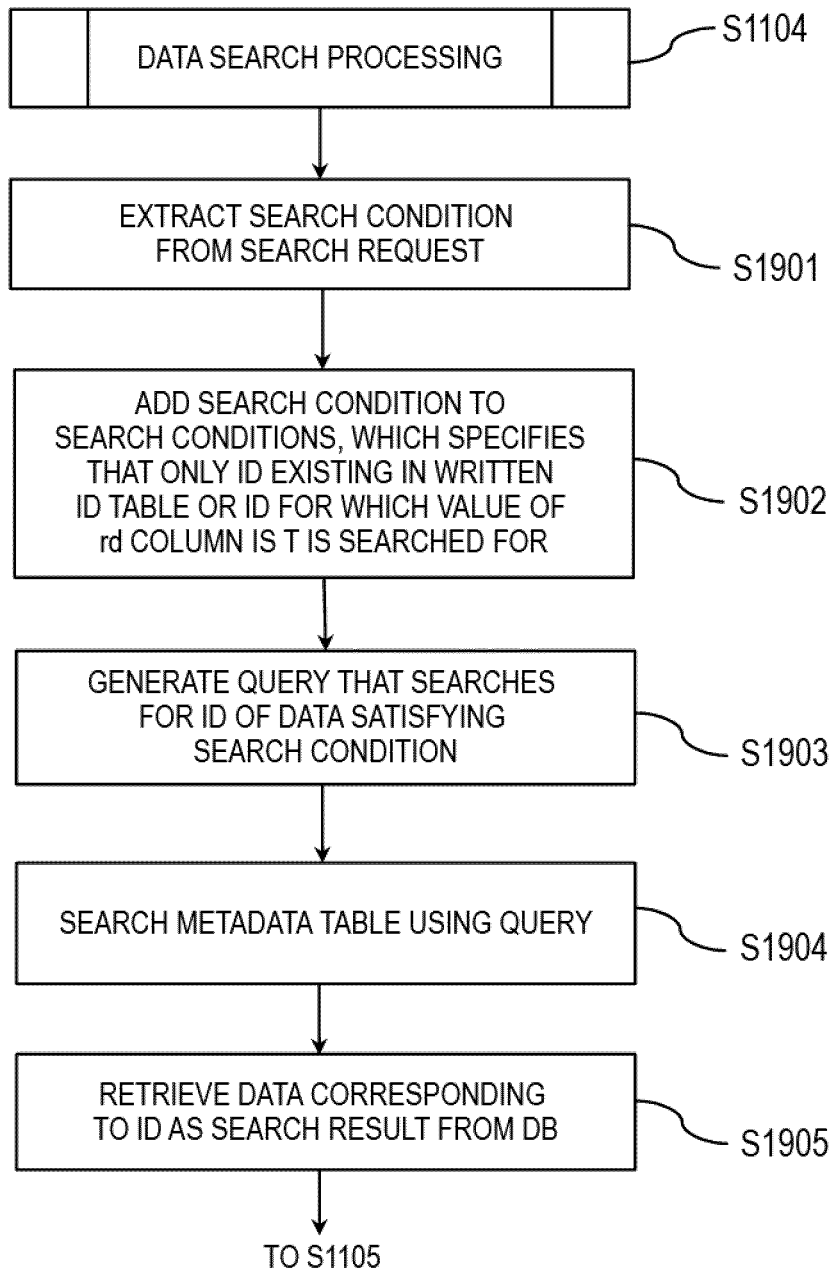
FIG. 19 is a flowchart for illustrating an example of a detailed processing procedure of the data search processing (Step S1104) illustrated in FIG. 11 according to the second embodiment.

FIG. 19 is a flowchart for illustrating an example of a detailed processing procedure of the data search processing (Step S1104) illustrated in FIG. 11 according to the second embodiment. First, the search system 100 extracts the search condition r1 from a search request (Step S1901). Next, the search system 100 adds a search condition (r2 OR r3) to the search condition r1, which specifies that only an ID existing in the written ID table 132 or an ID for which the value of the rd column 1302 is T is searched for (Step S1902).

Then, the search system 100 generates the query Q21 for searching for only an ID of data satisfying the search condition (r1 AND (r2 OR r3)) (Step S1903). After that, the search system 100 searches the metadata table 131 using the generated query Q21 (Step S1904), and retrieves the data corresponding to the ID as the search result from the object storage 104 (Step S1905). Then, the search system 100 ends the data search processing (Step S1104), and returns to Step S1105.

In this manner, the search system 100 according to the second embodiment suppresses enlargement of the written ID table 132 and achieve saying memories. Further, in the same way as in the first embodiment, the search system 100 executes the writing and extraction of metadata and the writing of data in parallel, and hence the metadata is written into the metadata table 131 without waiting for the data as its extraction source to be written. Therefore, the search system 100 can execute the count processing using only the metadata table 131 in real time without waiting for the data to be written.

Further, the target of the data search is data already written at the time of the search. Thus, the error indicating non-presence of data associated with the metadata can be avoided. Further, it is possible to write and count only the metadata ahead of the data, and hence the performance of extraction and writing of metadata is not affected by the performance of storing of data. In this manner, it is possible to improve the real time performance of the search processing for data and its metadata that are written in parallel.

Third Embodiment

Next, a description is given of a third embodiment of this invention. The third embodiment is an example in which data is searched for by referring to the metadata table 131 after waiting for the data to be written into the object storage 104 in the first and second embodiments. In the first embodiment, regarding data whose metadata is written into the metadata table 131 but that is not written into the object storage 104, the data is excluded from the search target at the time of a data search request in order to prevent occurrence of the search error. In contrast, in the third embodiment, a search apparatus 200 waits for such data to be written into the object storage 104, and includes the data in the search target when the data is written into the object storage 104.

<Example of Search Processing>

Figure 20:
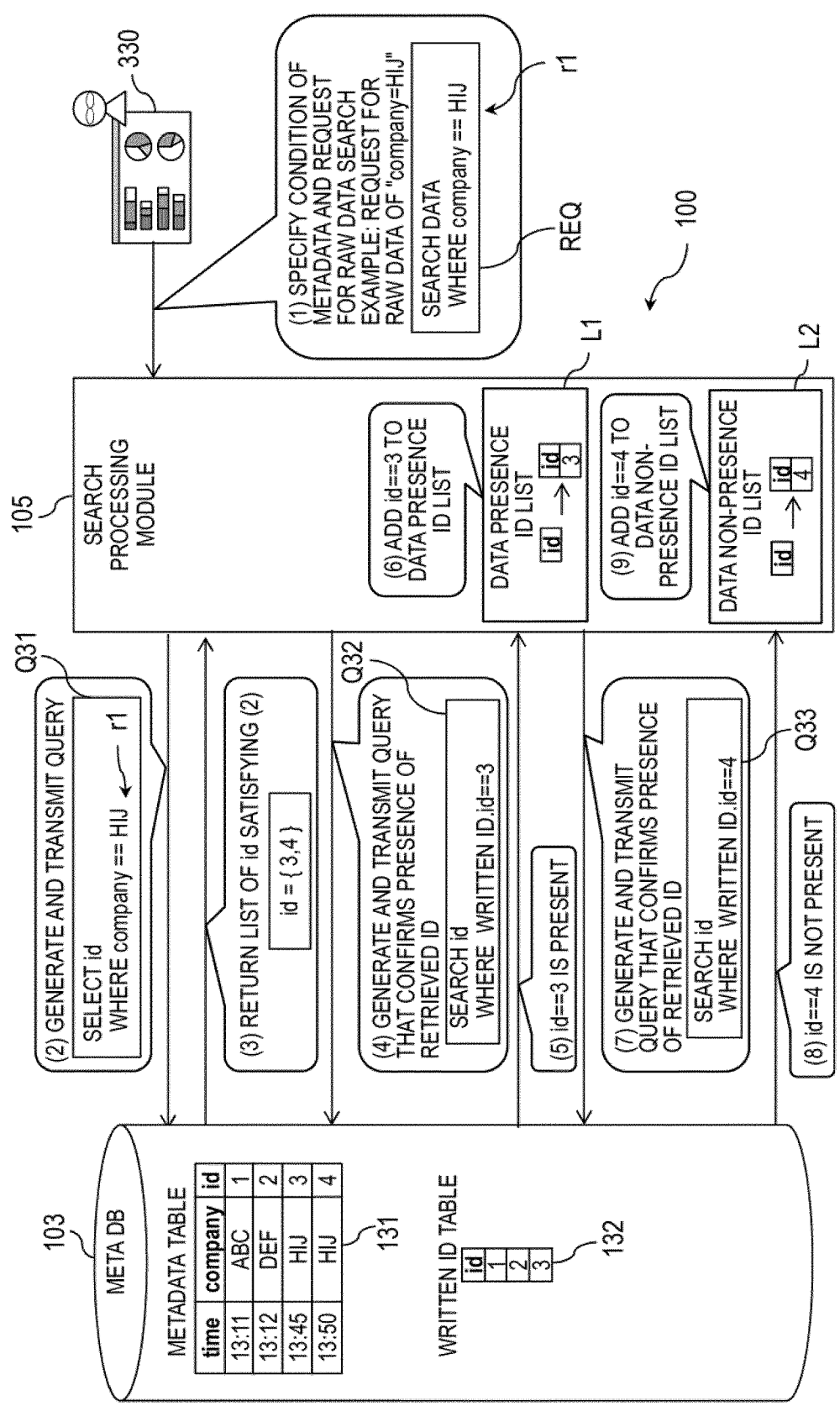
FIG. 20 is an explanatory diagram for illustrating an example of data search processing according to the third embodiment.
Figure 21:
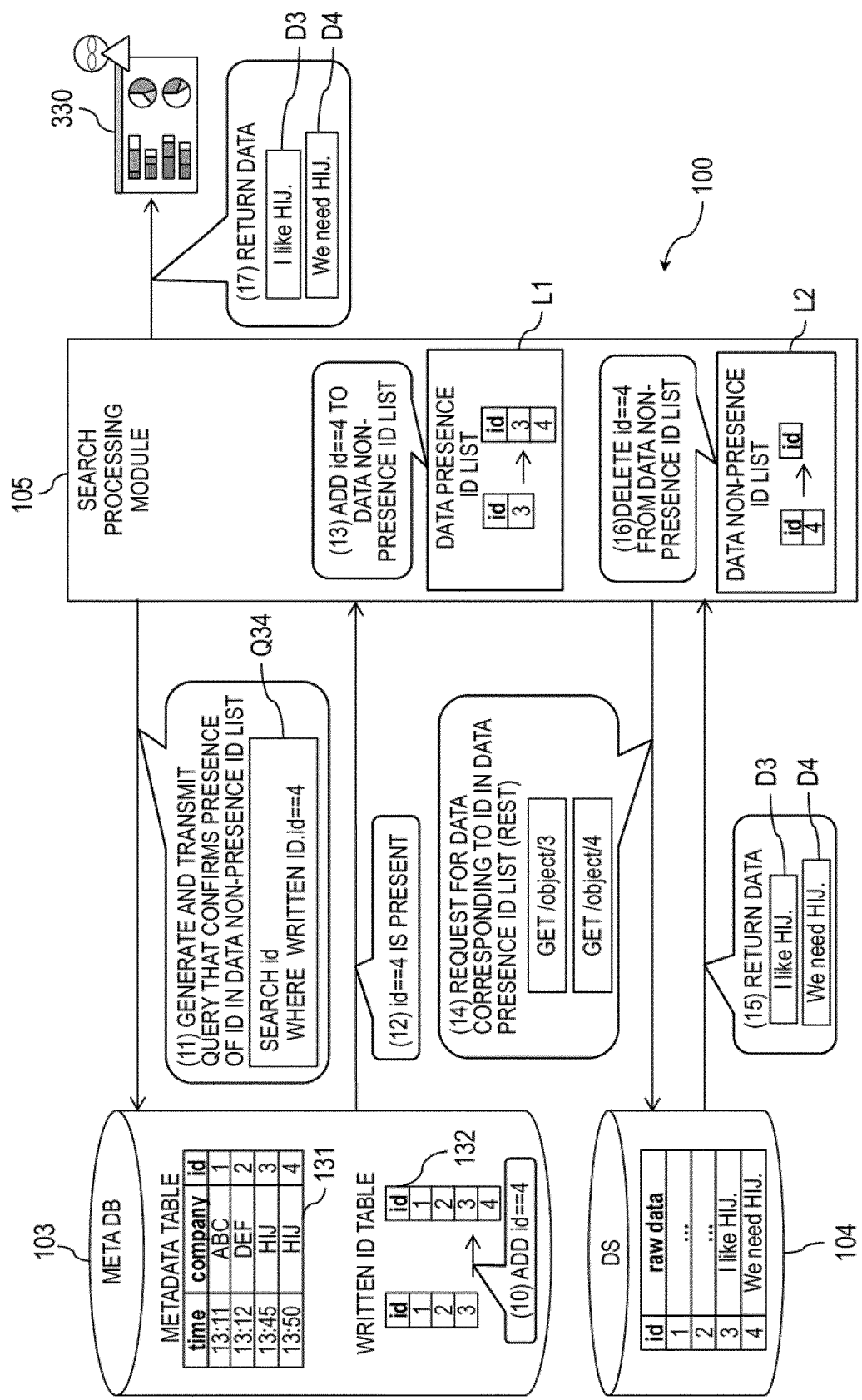
FIG. 21 is an explanatory diagram for illustrating an example of data search processing according to the third embodiment.

FIG. 20 and FIG. 21 are each an explanatory diagram for illustrating an example of data search processing according to the third embodiment. In FIG. 20, a description is given taking as an example a situation in which, as illustrated in FIG. 1, the data D3 and its metadata M3 of the data sequence D are already written, and the D4 is not written into the object storage 104 yet whereas the metadata M4 is already written into the metadata table 131.

In FIG. 20, (1) the search processing module 105 first receives a data search request from the client terminal 330. In this case, the search processing module 105 receives the search request REQ including the search condition r1 specifying company=HIJ as the company name as an example.

(2) Next, the search processing module 105 generates a query Q31 including the search condition r1 and transmits the query Q31 to the meta DB 103 to search the metadata table 131.

(3) As a result, the search processing module 105 retrieves id={3, 4} from the meta DB 103 as IDs of metadata including "HIJ". (4) Then, the search processing module 105 generates a query Q32 that confirms the presence of one of the retrieved IDs and transmits the query Q32 to the meta DB 103 to search the written ID table 132. In this case, the query Q32 is a query that confirms the presence of id=3.

(5) As a result, the search processing module 105 receives a search result indicating that id=3 is present in the written ID table 132. (6) Thus, the search processing module 105 adds id=3 to a data presence ID list L1.

(7) In addition, the search processing module 105 generates a query Q33 that confirms the presence of one of the retrieved IDs and transmits the query Q33 to the meta DB 103 to search the written ID table 132. In this case, the query Q33 is a query that confirms the presence of id=4.

(8) As a result, the search processing module 105 receives a search result indicating that id=4 is not present in the written ID table 132. (9) Thus, the search processing module 105 adds id=4 to a data non-presence ID list L2. The description is continued with reference to FIG. 21.

In FIG. 21, (10) id=4 is written into the written ID table 132. (11) The search processing module 105 generates again a query Q34 that confirms the presence of one of the retrieved IDs and transmits the query Q34 to the meta DB 103 to search the written ID table 132.

(12) As a result, the search processing module 105 receives a search result indicating that id=4 is present in the written ID table 132. (13) Thus, the search processing module 105 adds id=4 to the data presence ID list L1. (14) Further, the search processing module 105 deletes id=4 from the data non-presence ID list L2.

(15) After that, the search processing module 105 requests for retrieval of data corresponding to the IDs in the data presence ID list L1. Because id=3, 4 are written into the written ID table 132, the data D3 and D4 are already stored in the object storage 104. (16) Accordingly, the search processing module 105 retrieves the data D3 and D4 from the object storage 104. (17) Then, the search processing module 105 returns the retrieved data D3 and D4 to the client terminal 330.

In this manner, the search processing module 105 blocks the data search until the data D4 is written into the object storage 104, and can retrieve the data D4 from the object storage 104 as soon as the data is written into the object storage 104. Therefore, the search processing module 105 is useful when it is desired to retrieve data whose metadata is written into the metadata table 131. Further, the data D4 remains registered in the data non-presence ID list L2 until the data D4 is written into the object storage 104, and hence the search processing module 105 can avoid the search error caused by searching for the data D4, which is not stored in the object storage 104.

<Example of Functional Configuration of Search System 100>

Figure 22:
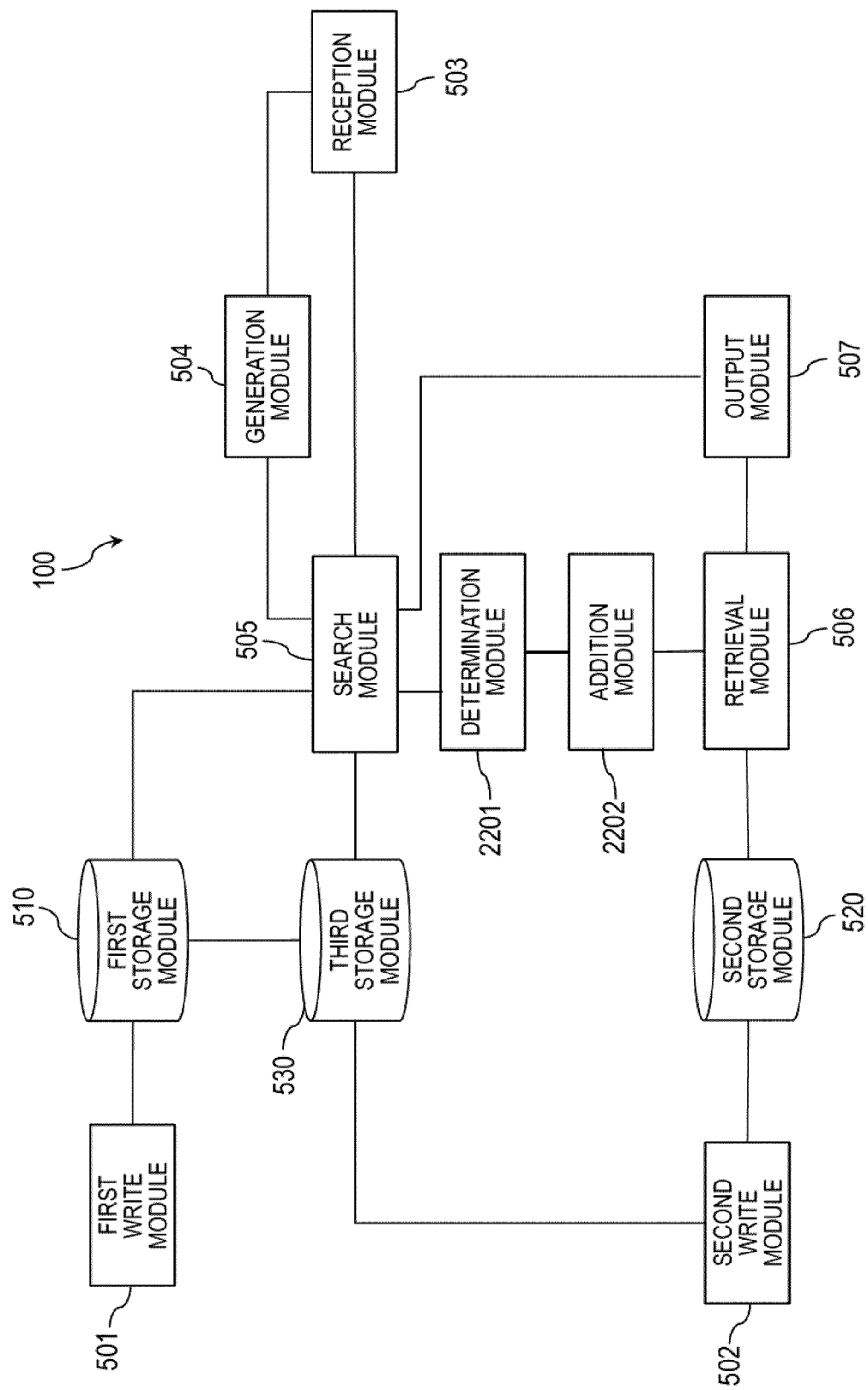
FIG. 22 is a block diagram for illustrating an example of a functional configuration of a search system according to the third embodiment.

FIG. 22 is a block diagram for illustrating an example of a functional configuration of a search system 100 according to the third embodiment. The search system 100 according to the third embodiment has a configuration in which a determination module 2201 and an addition module 2202 are added to the search system 100 illustrated in the first embodiment or the second embodiment. Specifically, for example, the functions of the determination module 2201 and the addition module 2202 are realized by the processor 201 executing programs stored in the storage device 202 illustrated in FIG. 2.

In the third embodiment, when the search request is the data search, the generation module 504 does not generate a query obtained by adding the second search condition r2 or the third search condition r3 to the first search condition r1, but rather generates a query including the first search condition r1 as illustrated in FIG. 20 or generates a query for retrieving an ID in the data non-presence ID list L2.

The determination module 2201 determines whether or not the identification information retrieved by the search module 505 or the identification information to be added is present in the third storage module 530. Specifically, for example, the determination module 2201 determines whether or not the IDs retrieved in (3) of FIG. 20 are present in the written ID table 132. More specifically, the determination module 2201 transmits a query to the written ID table 132 as illustrated in (4) of FIG. 20 to retrieve a result of ID presence or non-presence. The identification information to be added is an ID registered in a second list described later, that is, the data non-presence ID list L2. This ID is also a determination target of the determination module 2201, and hence the determination processing by the determination module 2201 is executed recursively until the data non-presence ID list L2 is empty.

The addition module 2202 adds the identification information determined to be present by the determination module 2201 to a first list indicating that the data identified by this identification information is present in the second storage module 520. Specifically, for example, when an ID is present in the written ID table 132 as illustrated in (5) of FIG. 20 and (12) of FIG. 21, the addition module 2202 adds this ID to the data presence ID list L1.

Further, the addition module 2202 adds the identification information determined not to be present by the determination module 2201 to the second list indicating that the data identified by this identification information is not present in the second storage module 520. Specifically, for example, when an ID is not present in the written ID table 132 as illustrated in (8) of FIG. 20, the addition module 2202 adds this ID to the data non-presence ID list L2. Then, the addition module 2202 sets the identification information added to the second list as the identification information to be added. As a result, the IDs registered in the data non-presence ID list L2 become the determination targets of the determination module 2201.

<Data Search Processing (Step S1104)>

Next, a description is given of the search processing (Step S1104) executed by the search system 100. The processing of the search processing module 105 according to the third embodiment is the same as the search processing illustrated in FIG. 11, but is different in the data search processing (Step S1104). Therefore, only the data search processing (Step S1104) is described in the third embodiment.

Figure 23:
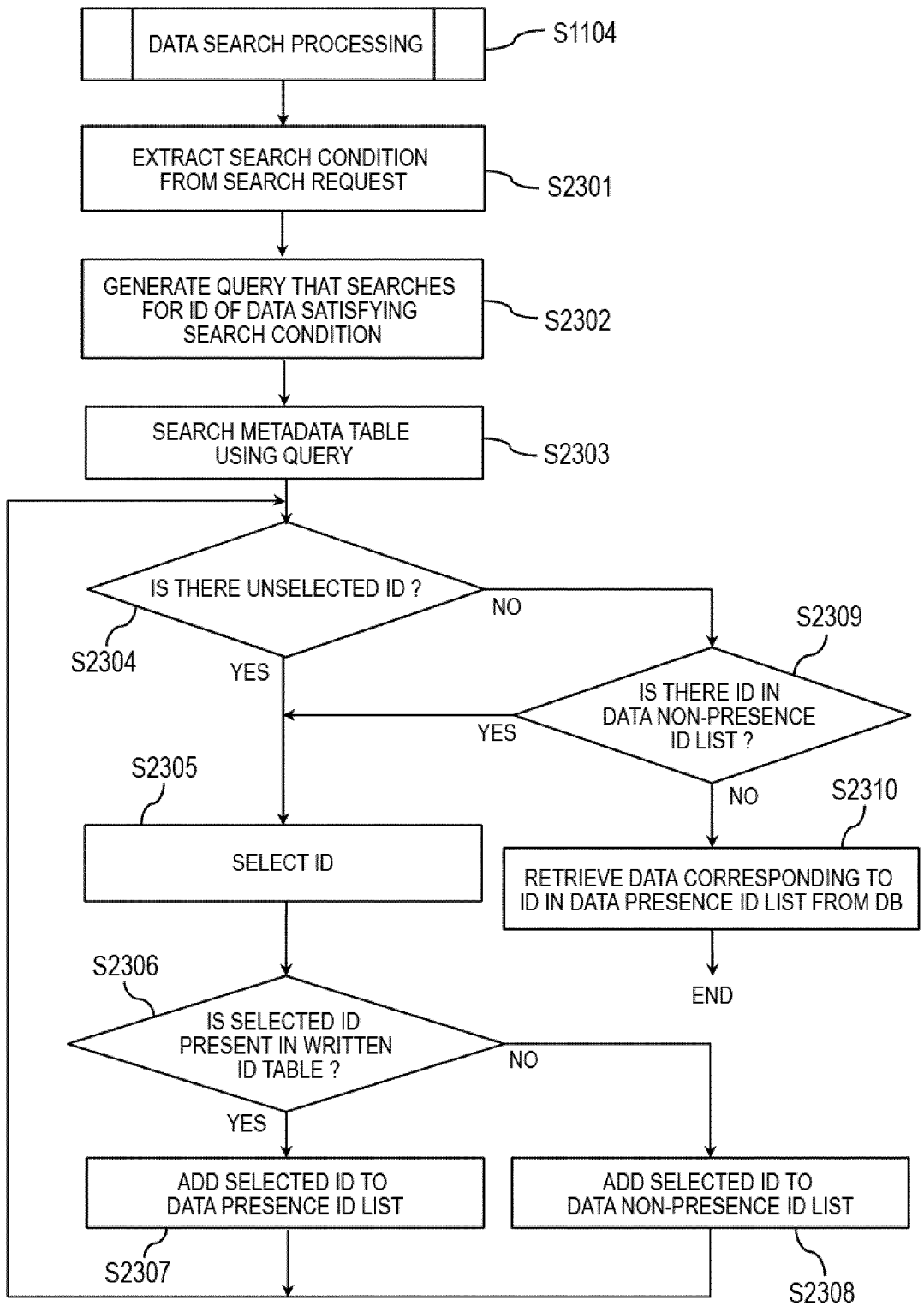
FIG. 23 is a flowchart for illustrating an example of a detailed processing procedure of the data search processing (Step S1104) illustrated in FIG. 11 according to the third embodiment.

FIG. 23 is a flowchart for illustrating an example of a detailed processing procedure of the data search processing (Step S1104) illustrated in FIG. 11 according to the third embodiment. First, the search system 100 extracts the search condition r1 from the search request (Step S2031). Next, the search system 100 generates the query Q31 for searching for an ID of data satisfying the extracted search condition r1 (Step S2302).

After that, the search system 100 searches the metadata table 131 using the generated query Q31 (Step S2303).

Then, the search system 100 determines whether or not there is an unselected ID among the retrieved IDs (Step S2304). When there is an unselected ID (Step S2304: Yes), the search system 100 selects the unselected ID (Step S2305) to determine whether or not the selected ID is present in the written ID table 132 (Step S2306).

When the selected ID is present in the written ID table 132 (Step S2306: Yes), the search system 100 adds the selected ID to the data presence ID list L1 (Step S2307), and returns to Step S2304. On the other hand, when the selected ID is not present in the written ID table 132 (Step S2305: No), the search system 100 adds the selected ID to the data non-presence ID list L2 (Step S2308), and returns to Step S2304.

Further, in Step S2304, when there is no unselected ID (Step S2304: No), the search system 100 determines whether or not there is an ID in the data non-presence ID list L2 (Step S2309). When there is an ID in the data non-presence ID list L2 (Step S2309: Yes), the search system 100 selects the ID (Step S2305) to determine again whether or not the ID is present in the written ID table 132 (Step S2306).

Further, in Step S2309, when there is no ID in the data non-presence ID list L2 (Step S2309: No), it follows that all of the data corresponding to the IDs retrieved in Step S2303 have been written into the object storage 104 and those IDs have been registered in the data presence ID list L1 in Step S2307. Thus, the search system 100 retrieves data corresponding to the IDs present in the data presence ID list L1 from the object storage 104 (Step S2310).

It should be noted that, in Step S2310, the search system 100 retrieves data in the case in which all of the IDs retrieved in Step S2303 are registered in the data presence ID list L1. However, the search system 100 may retrieve data for each ID when the ID is added to the data presence ID list L1 in Step S2307.

In this manner, according to the third embodiment, at the time of a data search, regarding data whose metadata is written into the metadata table 131 but that is not written into the object storage 104, the search system 100 waits for the data to be written into the object storage 104 and sets the data as the search target when the data is written into the object storage 104. Therefore, the search system 100 can block a data search until data is written into the object storage 104, and retrieve the data from the object storage 104 as soon as the data is written into the object storage 104. Further, the search system 100 can avoid the search error caused by searching for data that is not stored in the object storage 104.

Further, in the same way as in the first embodiment, the search system 100 executes the writing and extraction of metadata and the writing of data in parallel, and hence the metadata is written into the metadata table 131 without waiting for the data as its extraction source to be written. Therefore, the search system 100 can execute the count processing using only the metadata table 131 in real time without waiting for the data to be written. Further, by employing the second embodiment, it is possible to suppress enlargement of the written ID table 132 and achieve saving memories.

It should be noted that the search systems 100 according to the first to third embodiments have the connection configuration illustrated in FIG. 2, but may have another connection configuration.

FIG. 24 is a block diagram for illustrating a configuration example of the search apparatus 2400. Any one of or all of the search processing module 105, the metadata extraction and write processing module 101, the data write processing module 102, and the meta DB 103 may operate on the same computer. FIG. 24 is a configuration example of the case in which all the above are included in one search apparatus 2400. It should be noted that, for the object storage system, the data 133 in the storage device group 208 and the control module 351 in the memory 207 correspond to the object storage system in FIG. 24.

Figure 25:
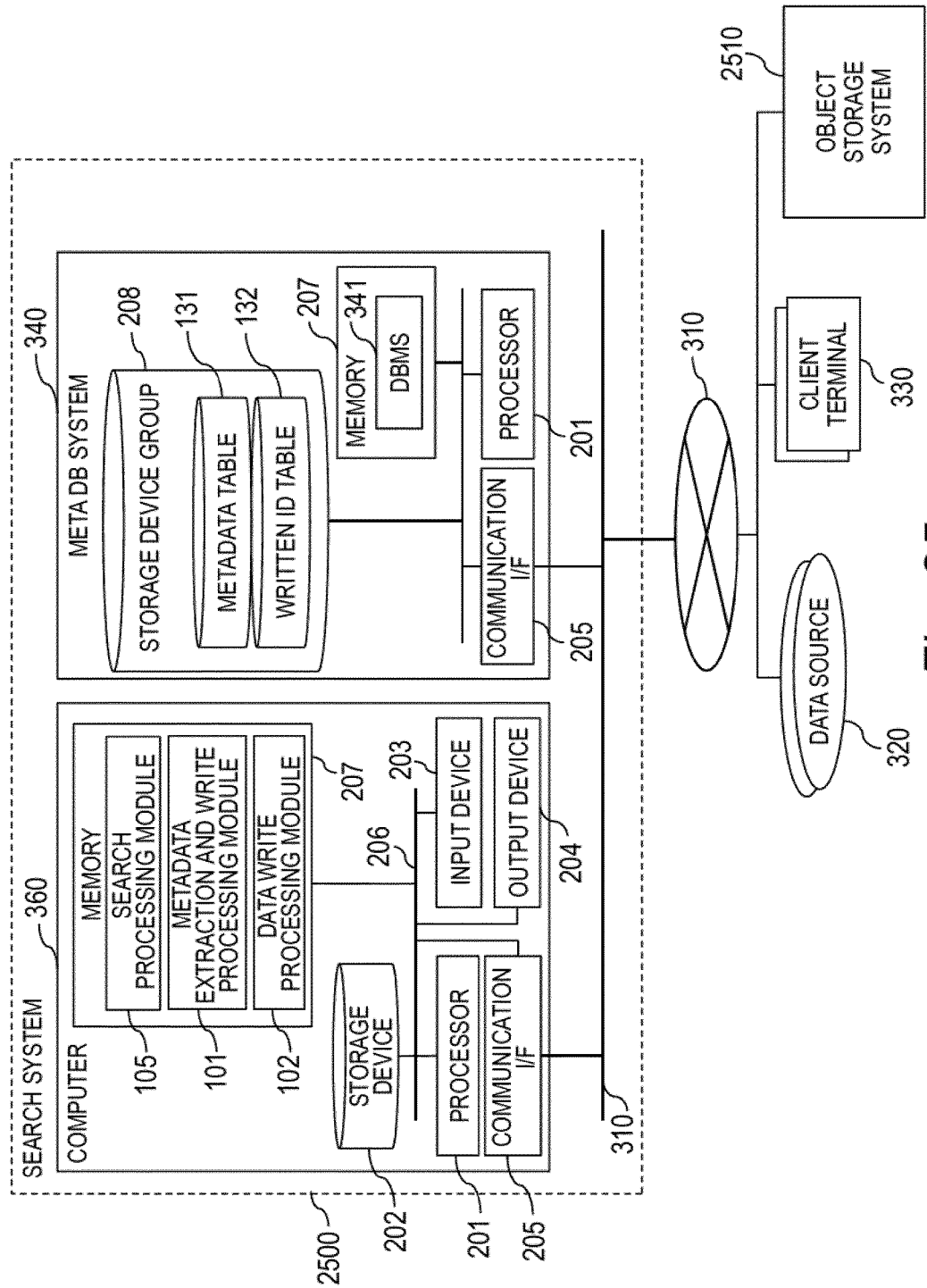
FIG. 25 is a block diagram for illustrating an example of another configuration of the search system.

In the case of FIG. 25, a search system 2500 has a configuration in which the computer 360, which includes the search processing module 105, the metadata extraction and write processing module 101, and the data write processing module 102, and the meta DB system 340 are coupled to each other via the network 310. An object storage system 2510 is coupled to the network 310 outside of the search system 2500. This configuration is employed in the case in which, for example, the search processing and the write processing are executed in a local network, the metadata is held in the local network, and the data is stored in a cloud.

As described above, according to the present invention, it is possible to improve the real time performance of the search processing module 105 for data and its metadata that are written in parallel.

What is claimed is:

1. A search system, comprising:
a processor configured to execute a program;
a memory configured to store the program to be executed by the processor; and
an interface,
the processor being configured to execute:
a first write procedure of extracting, for each of data in a data sequence input through the interface, metadata from the each of data in input order and writing the metadata into a first storage module in association with identification information for uniquely identifying the data;
a second write procedure of writing, in parallel with the first write procedure of extracting the metadata and writing the metadata into the first storage module, the each of data in the data sequence into a second storage module in input order in association with the identification information for uniquely identifying the data, and writing the identification information for uniquely identifying the data written into the second storage module into a third storage module;
a reception procedure of receiving a search request including a first search condition relating to search target data through the interface;
a search procedure of searching a search destination, which is selected from (i) the first storage module storing the metadata and (ii) the third storage module storing the identification information for uniquely identifying the data in accordance with the search request received in the reception procedure, for the identification information satisfying the first search condition, wherein the first storage module is selected as the search destination when the search request is a metadata count request to count a number of pieces of identification information grouped by information corresponding to the first search condition, and wherein the number of pieces of identification information grouped by the information corresponding to the first search condition is counted; and
an output procedure of outputting a search result retrieved in the search procedure through the interface.

2. The search system according to claim 1,
wherein the processor is configured to execute, when the search request is a request to search for the search target data, a generation procedure of generating inquiry information including the first search condition and a second search condition indicating that the identification information for uniquely identifying the data is already written into the third storage module, and
wherein, in the search procedure, the processor is configured to search for, when the inquiry information is generated in the generation procedure, identification information satisfying the first search condition in the first storage module and satisfying the second search condition in the third storage module.

3. The search system according to claim 2,
wherein the processor is configured to execute:
an identification procedure of uniquely identifying, in the first storage module, metadata associated with any one of pieces of identification information written into the third storage module;
a setting procedure of setting, in the first storage module, write completion information indicating that data associated with the metadata identified in the identification procedure is already written into the second storage module;
a deletion procedure of deleting, when the write completion information is set in the setting procedure, the any one of pieces of identification information from the third storage module; and
a generation procedure of generating, when the search request is the request to search for the search target data, inquiry information for searching for identification information satisfying both the first search condition, and one of a second search condition indicating that the identification information for uniquely identifying the data is already written into the third storage module and a third search condition indicating that the data is already written into the second storage module, the inquiry information including the first search condition, the second search condition, and the third search condition, and
wherein, in the search procedure, the processor is configured to search the second storage module for the identification information satisfying the inquiry information generated in the generation procedure.

4. The search system according to claim 2,
wherein the processor is configured to execute a retrieval procedure of retrieving data identified by the identification information, which is a search result retrieved in the search procedure, from the second storage module, and
wherein, in the output procedure, the processor is configured to output the data retrieved in the retrieval procedure through the interface.

5. A search system, comprising:
a processor configured to execute a program;
a memory configured to store the program to be executed by the processor; and
an interface,
the processor being configured to execute:
a first write procedure of extracting, for each of data in a data sequence input through the interface, metadata from the each of data in input order and writing the metadata into a first storage module in association with identification information for uniquely identifying the data;
a second write procedure of writing, in parallel with the first write procedure of extracting the metadata and writing the metadata into the first storage module, the each of data in the data sequence into a second storage module in input order in association with the identification information for uniquely identifying the data, and writing the identification information for uniquely identifying the data written into the second storage module into a third storage module;
a reception procedure of receiving a search request including a search condition of search target data through the interface;
a search procedure of searching the first storage module as a search destination for identification information satisfying the search condition included in the search request received in the reception procedure, wherein the first storage module is selected as the search destination when the search request is a metadata count request to count a number of pieces of identification information grouped by information corresponding to the search condition, and wherein the number of pieces of identification information grouped by the information corresponding to the search condition is counted;
a determination procedure of determining whether or not one of the identification information retrieved in the search procedure and identification information to be added is present in the third storage module;
an addition procedure of adding identification information determined to be present in the determination procedure to a first list indicating that data identified by the identification information is present in the second storage module, and adding identification information determined not to be present in the determination procedure to a second list indicating that data identified by the identification information is not present in the second storage module, to thereby set the identification information added to the second list as the identification information to be added;
a retrieval procedure of retrieving data identified by the identification information added to the first list in the addition procedure from the second storage module; and
an output procedure of outputting the data retrieved in the retrieval procedure through the interface.

6. The search system according to claim 5,
wherein the processor is configured to execute:
an identification procedure of uniquely identifying, in the first storage module, metadata associated with any one of pieces of identification information written into the third storage module;
a setting procedure of setting, in the first storage module, write completion information indicating that data associated with the metadata identified in the identification procedure is already written into the second storage module;
a deletion procedure of deleting, when the write completion information is set in the setting procedure, the any one of pieces of identification information from the third storage module; and
a generation procedure of generating, when the search request is the request to search for the search target data, inquiry information for searching for identification information satisfying both the first search condition, and one of a second search condition indicating that the identification information for uniquely identifying the search target data is already written into the third storage module and a third search condition indicating that the search target data is already written into the second storage module, the inquiry information including the first search condition, the second search condition, and the third search condition, and wherein, in the search procedure, the processor is configured to search the second storage module for the identification information satisfying the inquiry information generated in the generation procedure.

7. A search method to be executed by a search system, the search system comprising:
a processor configured to execute a program;
a memory configured to store the program to be executed by the processor; and
an interface,
the search method comprising:
a first write procedure of extracting, by the processor, for each of data in a data sequence input through the interface, metadata from the each of data in input order and writing the metadata into a first storage module in association with identification information for uniquely identifying the data;
a second write procedure of writing, by the processor, in parallel with the first write procedure of extracting the metadata and writing the metadata into the first storage module, the each of data in the data sequence into a second storage module in input order in association with the identification information for uniquely identifying the data, and writing the identification information for uniquely identifying the data written into the second storage module into a third storage module;
a reception procedure of receiving, by the processor, a search request including a first search condition relating to search target data through the interface;
a search procedure of searching, by the processor, a search destination, which is selected from (i) the first storage module storing the metadata and (ii) the third storage module storing the identification information for uniquely identifying the data in accordance with the search request received in the reception procedure, for the identification information satisfying the first search condition, wherein the first storage module is selected as the search destination when the search request is a metadata count request to count a number of pieces of identification information grouped by information corresponding to the first search condition, and wherein the number of pieces of identification information grouped by the information corresponding to the first search condition is counted; and
an output procedure of outputting, by the processor, a search result retrieved in the search procedure through the interface.

8. The search method according to claim 7, further comprising a generation procedure of generating, by the processor, when the search request is a request to search for the search target data, inquiry information including the first search condition and a second search condition indicating that the identification information for uniquely identifying the data is already written into the third storage module,
wherein the search procedure comprises searching, by the processor, when the inquiry information is generated in the generation procedure, for identification information satisfying the first search condition in the first storage module and satisfying the second search condition in the third storage module.

9. The search method according to claim 8, further comprising:
an identification procedure of uniquely identifying, by the processor, in the first storage module, metadata associated with any one of pieces of identification information written into the third storage module;
a setting procedure of setting, by the processor, in the first storage module, write completion information indicating that data associated with the metadata identified in the identification procedure is already written into the second storage module;
a deletion procedure of deleting, by the processor, when the write completion information is set in the setting procedure, the any one of pieces of identification information from the third storage module; and
a generation procedure of generating, by the processor, when the search request is the request to search for the search target data, inquiry information for searching for identification information satisfying both the first search condition, and one of a second search condition indicating that the identification information for uniquely identifying the data is already written into the third storage module and a third search condition indicating that the data is already written into the second storage module, the inquiry information including the first search condition, the second search condition, and the third search condition,
wherein the search procedure comprises searching, by the processor, the second storage module for the identification information satisfying the inquiry information generated in the generation procedure.

10. The search method according to claim 8, further comprising a retrieval procedure of retrieving, by the processor, data identified by the identification information, which is a search result retrieved in the search procedure, from the second storage module,
wherein the output procedure comprises outputting, by the processor, the data retrieved in the retrieval procedure through the interface.

* * * * *